United States Patent
Van Der Auwera et al.

(10) Patent No.: US 9,451,258 B2
(45) Date of Patent: Sep. 20, 2016

(54) CHROMA SLICE-LEVEL QP OFFSET AND DEBLOCKING

(71) Applicant: QUALCOMM Incorporated, San Diego, CA (US)

(72) Inventors: Geert Van Der Auwera, San Diego, CA (US); Xianglin Wang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 661 days.

(21) Appl. No.: 13/826,124

(22) Filed: Mar. 14, 2013

(65) Prior Publication Data
US 2013/0259141 A1 Oct. 3, 2013

Related U.S. Application Data

(60) Provisional application No. 61/619,806, filed on Apr. 3, 2012, provisional application No. 61/668,810, filed on Jul. 6, 2012, provisional application No. 61/704,941, filed on Sep. 24, 2012, provisional application No. 61/708,497, filed on Oct. 1, 2012.

(51) Int. Cl.
*H04N 7/26* (2006.01)
*H04N 1/409* (2006.01)
(Continued)

(52) U.S. Cl.
CPC ...... *H04N 19/00909* (2013.01); *H04N 19/117* (2014.11); *H04N 19/134* (2014.11);
(Continued)

(58) Field of Classification Search
CPC ............ H04N 19/186; H04N 19/102; H04N 19/124; H04N 19/126; H04N 19/10; H04N 19/63; H04N 19/635; H04N 19/117; H04N 19/42; H04N 19/439
USPC ....................... 375/240.29, 240.26
See application file for complete search history.

(56) References Cited

U.S. PATENT DOCUMENTS 8,331,444 B2 * 12/2012 Karczewicz ........... H04N 19/00
375/240.11
2006/0250653 A1 * 11/2006 Joch ..................... H04N 19/159
358/3.26

(Continued)

FOREIGN PATENT DOCUMENTS

TW    I353787 B    12/2011
TW    I354239 B    12/2011

(Continued)

OTHER PUBLICATIONS

Bross, High Efficiency video coding (HEVC) text specification draft 6, Feb. 2012, JCT-VC, Draft 6 p. 151-154.*

(Continued)

*Primary Examiner* — Mohammed Rahaman
*Assistant Examiner* — Jimmy S Lee
(74) *Attorney, Agent, or Firm* — Shumaker & Sieffert, P.A.

(57) ABSTRACT

In one example, an apparatus for processing video data comprises a video coder configured to, for each of the one or more chrominance components, calculate a chrominance quantization parameter for a common edge between two blocks of video data based on a first luminance quantization parameter for the first block of video data, a second luminance quantization parameter for the second block of video data, and a chrominance quantization parameter offset value for the chrominance component. The video coder is further configured to determine a strength for a deblocking filter for the common edge based on the chrominance quantization parameter for the chrominance component, and apply the deblocking filter according to the determined strength to deblock the common edge.

47 Claims, 6 Drawing Sheets

(51) Int. Cl.

| | |
|---|---|
| *H04N 19/86* | (2014.01) |
| *H04N 19/117* | (2014.01) |
| *H04N 19/14* | (2014.01) |
| *H04N 19/186* | (2014.01) |
| *H04N 19/174* | (2014.01) |
| *H04N 19/82* | (2014.01) |
| *H04N 19/134* | (2014.01) |

(52) U.S. Cl.
CPC ........... *H04N 19/14* (2014.11); *H04N 19/174* (2014.11); *H04N 19/186* (2014.11); *H04N 19/82* (2014.11); *H04N 19/86* (2014.11)

(56) References Cited

U.S. PATENT DOCUMENTS

| | | | |
|---|---|---|---|
| 2007/0189392 A1* | 8/2007 | Tourapis | H04N 19/176 375/240.21 |
| 2007/0217508 A1 | 9/2007 | Shimada et al. | |
| 2008/0317377 A1* | 12/2008 | Saigo | H04N 9/045 382/274 |
| 2011/0110648 A1 | 5/2011 | Sakaniwa | |
| 2011/0222607 A1* | 9/2011 | An | H04N 19/159 375/240.24 |
| 2012/0027083 A1 | 2/2012 | Narroschke et al. | |
| 2012/0027092 A1* | 2/2012 | Matsui | H04N 19/105 375/240.16 |
| 2012/0207228 A1 | 8/2012 | Winger et al. | |
| 2013/0022281 A1 | 1/2013 | Sato | |
| 2013/0259120 A1 | 10/2013 | Van et al. | |

FOREIGN PATENT DOCUMENTS

| | | |
|---|---|---|
| TW | I354481 B | 12/2011 |
| TW | I354495 B | 12/2011 |

OTHER PUBLICATIONS

International Preliminary Report on Patentability from International Application No. PCT/US2013/034961, dated Jul. 1, 2014, 15 pp.
Auwera et al., "AHG6: Chroma QP Offsets and chroma Deblocking Filtering", JCT-VC Meeting; MPEG Meeting Apr. 27-May 7, 2012; Geneva; (Joint Collaborative Team on Video Coding of ISO/IEC JTCV1/SC29/WG11 and ITU-T SG.16); URL: http://wftp3.itu.int/av-arch/jctvc-site/,, No. JCTVC-I0283, XP030112046, 4 pp.
Bross et al., "WD6: High Efficiency Video Coding (HEVC) Text Specification draft 6—Version d1", 7th Meeting; Geneva, CH,Nov. 21-30, 2011, No. JCTVC-H1003_dl, XP055068694, http://phenix.int-evry.fr/jct, 267 pp.
Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Chono et al., "Bug Fix to the Current Text", Apr. 5, 2012, XP055068767, 3pp., Retrieved from the Internet : URL: https://hevc.hhi.fraunhofer.de/trac/hevc/ticket/463.
Huang et al., "CE10 Subtest1: Chroma Deblocking Filter—Working Draft Deblocking Filter Process", (Joint Colloborative Team on Video Coding of ISO/IEC JTC1/SC29/WG11 and ITU-T SG.16). 7th Meeting; Geneva, CH, Feb. 1-10, 2012, No. JCTVC-H310 v1, XP055068804, http://phenix.int-evry.fr/jct/doc_end_user/current_document.php?id=4613, section 8.6.1.4.3, 21 pp.
International Search Report and Written Opinion—PCT/US2013/034961—ISA/EPO—Jul. 11, 2013, 20 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Wiegand et al., JVT: "Draft ITU-T Recommendation and Final Draft International Standard of Joint Video Specification (ITU-T Rec. H .264 ISO/IEC 14496-10 AVC)", JVT Meeting;MPEG Meeting; May 23-28, 2003; Pattaya,TH; (Joint Video Team of ISO/IEC JTC1/SC29/WG11 and ITU-T 56.16 ), No. JVT-G050r1, XP030005712, ISSN: 0000-0427, 269 pp.
Norkin et al., "Non-CE12: deblocking parameters signalling in slice header", JCT-VC Meeting; MPEG Meeting; Nov. 21-30, 2011; Geneva; (Joint Collaborative Team on Video Coding of ISO/IEC JTC1/SC29/WG11 and ITU-T SG.16 ); URL: http://wftp3.itu.int/av-arch/jctvc-site/,, No. JCTVC-G619, XP030110603, 4 pp.
Sullivan et al., "Chroma QP Range Extension", JCT-VC Meeting; MPEG Meeting; Jul. 11-20, 2012; Stockholm; (Joint Collaborative Team on Video Coding of ISO/IEC JTC1/SC29/WG11 and ITU-T SG.16); http://wftp3.itu.int/av-arch/jctvc—site No. JCTVC-J0342, XP030112704, 8 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Wiegand et al., "WD1: Working Draft 1 of High-Efficiency Video Coding", JCTVC-C403, 3rd Meeting: Guangzhou, CN, Oct. 7-15, 2010, 137 pp.
Xu et al., "Chroma QP Extension and Signalling Enhancement", JCT-VC Meeting; MPEG Meeting; Apr. 27-May 7, 2012; Geneva; (Joint Collaborative Team on Video Coding of ISO/IEC JTCV1/SC29/WG11 and ITU-T SG.16); URL: http://wftp3.itu.int/av-arch/jctvc-site/,, No. JCTVC-I0265, XP030112028, 11 pp.
Xu et al., "Consideration on Chroma QP Range Extension for HEVC Version 1 and 2", JCT-VC Meeting; MPEG Meeting; Jul. 11-20, 2012; Stockholm; (Joint Colloborative Team on Video Coding of ISO/IEC JTC1/SC29/WG11 and ITU-T SG.16); URL: http://wftp3.itu.int/av-arch/jctvc-site/ No. JCTVC-J0318, XP030112680, 5 pp.
Yamakage et al., "CE12: Deblocking Filter Parameter Adjustment in Slice Level", JCT-VC Meeting; MPEG Meeting; Nov. 21-30, 2011; Geneva; (Joint Colloborative Team on Video Coding of ISO/IEC JTC1/SC29/WG11 and ITU-T SG.16); URL: http://eftp3.itu.int/av-arch/jctvc-site/ No. JCTVC-G174, XP030110158, 8 pp.
Second Written Opinion of international application No. PCT/US2013/034961, mailed Mar. 18, 2014, 8 pp.

* cited by examiner

CHROMA SLICE-LEVEL QP OFFSET AND DEBLOCKING

This application claims the benefit of the following U.S. Provisional Applications, the entire contents of each of which is incorporated herein by reference:

U.S. Provisional Application No. 61/619,806, filed Apr. 3, 2012;

U.S. Provisional Application No. 61/668,810, filed Jul. 6, 2012;

U.S. Provisional Application No. 61/704,941 filed Sep. 24, 2012; and

U.S. Provisional Application No. 61/708,497 filed Oct. 1, 2012.

TECHNICAL FIELD

This disclosure relates to video coding and, more particularly, to techniques for deblocking coded blocks of video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently. Other video compression techniques are described in the High efficiency video coding (HEVC) standard which is currently under development. The video devices may transmit, receive, encode, decode, and/or store digital video information more efficiently by implementing such video coding techniques.

For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference pictures.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for deblocking coded blocks of video data, e.g., transform units (TUs), coding units (CUs), or prediction units (PUs). Block-based video coding techniques can sometimes lead to "blockiness" artifacts, where boundaries or edges between individually coded blocks can be perceived. Such artifacts can arise when blocks are coded at different quality levels. An amount of quantization applied to a block (as indicated by a quantization parameter (QP)) can directly impact the quality of the block. Therefore, deblocking techniques typically take account of the QP of the block, e.g., when determining whether to deblock an edge of the block and how to deblock the edge.

The techniques of this disclosure may improve deblocking functions applied to such edges (e.g., reducing the appearance of an edge) and, more particularly, may improve the deblocking functions applied to the chrominance components at a common edge shared by two blocks of video data. In particular, according to the techniques of this disclosure, a video coder, e.g., a video encoder or video decoder, may calculate a chrominance quantization parameter for the edge between two blocks of video data not only based on the luminance quantization parameters for the two blocks of video data, but also based on a chrominance quantization parameter offset value. The video coder determines a strength for a deblocking filter for the common edge based on the chrominance quantization parameter. Because the video decoder determined the chrominance quantization parameter for the edge based on the chrominance quantization parameter offset value, the strength of the deblocking filter may be more appropriate for the quality levels of the chrominance components of the two blocks of video data that share the common edge.

In one example, a method for processing video data comprises decoding a first block of video data and a second block of video data, wherein the first block of video data and the second block of video data share a common edge, and determining a first luminance quantization parameter for the first block of video data and a second luminance quantization parameter for the second block of video data. The method further comprises, for each of one or more chrominance components, determining a chrominance quantization parameter offset value and, for each of the one or more chrominance components, calculating a chrominance quantization parameter for the edge based on the first luminance quantization parameter for the first block of video data, the second luminance quantization parameter for the second block of video data, and the chrominance quantization parameter offset value for the chrominance component. The method further comprises, for each of the one or more chrominance components, determining a strength for a deblocking filter for the common edge based on the chrominance quantization parameter for the chrominance component and, for each of the one or more chrominance components, applying the deblocking filter according to the determined strength to deblock the common edge.

In another example, an apparatus for processing video data comprises a video coder configured to decode a first block of video data and a second block of video data, wherein the first block of video data and the second block of video data share a common edge, and determine a first luminance quantization parameter for the first block of video data and a second luminance quantization parameter for the second block of video data. The video coder is further configured to, for each of one or more chrominance components, determine a chrominance quantization parameter offset value and, for each of the one or more chrominance components, calculate a chrominance quantization parameter for the edge based on the first luminance quantization parameter for the first block of video data, the second luminance quantization parameter for the second block of video data, and the chrominance quantization parameter offset value for the chrominance component. The video coder is further configured to, for each of the one or more chrominance components, determine a strength for a deblocking filter for the common edge based on the chrominance quantization parameter for the chrominance component and, for each of the one or more chrominance components, apply the deblocking filter according to the determined strength to deblock the common edge.

In another example, an apparatus for processing video data comprises means for decoding a first block of video data and a second block of video data, wherein the first block of video data and the second block of video data share a common edge, and means for determining a first luminance quantization parameter for the first block of video data and a second luminance quantization parameter for the second block of video data. The apparatus further comprises means for, for each of one or more chrominance components, determining a chrominance quantization parameter offset value, and means for, for each of the one or more chrominance components, calculating a chrominance quantization parameter for the edge based on the first luminance quantization parameter for the first block of video data, the second luminance quantization parameter for the second block of video data, and the chrominance quantization parameter offset value for the chrominance component. The apparatus further comprises means for, for each of the one or more chrominance components, determining a strength for a deblocking filter for the common edge based on the chrominance quantization parameter for the chrominance component, and means for, for each of the one or more chrominance components, applying the deblocking filter according to the determined strength to deblock the common edge.

In another example, a computer-readable storage medium comprises instructions stored thereon that, when executed, cause a processor of a video coder to decode a first block of video data and a second block of video data, wherein the first block of video data and the second block of video data share a common edge, and determine a first luminance quantization parameter for the first block of video data and a second luminance quantization parameter for the second block of video data. The instructions further cause the processor to, for each of one or more chrominance components, determine a chrominance quantization parameter offset value and, for each of the one or more chrominance components, calculate a chrominance quantization parameter for the edge based on the first luminance quantization parameter for the first block of video data, the second luminance quantization parameter for the second block of video data, and the chrominance quantization parameter offset value for the chrominance component. The instructions further cause the processor to, for each of the one or more chrominance components, determine a strength for a deblocking filter for the common edge based on the chrominance quantization parameter for the chrominance component and, for each of the one or more chrominance components, apply the deblocking filter according to the determined strength to deblock the common edge.

The details of one or more examples are set forth in the accompanying drawings and the description below. Other features, objects, and advantages will be apparent from the description and drawings, and from the claims.

DETAILED DESCRIPTION

Figure 1:
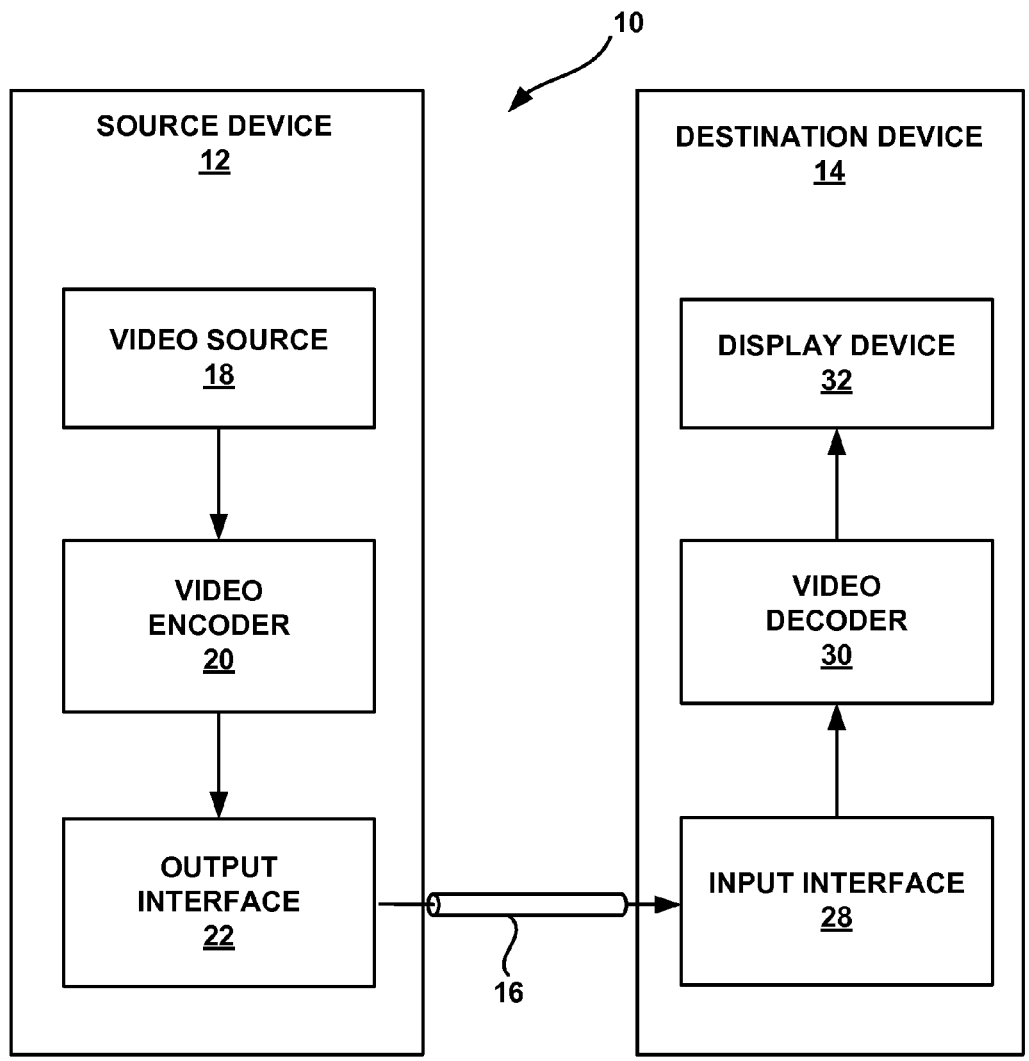
FIG. 1 is a block diagram illustrating an example video encoding and decoding system that may utilize techniques for deblocking edges between video blocks.

Video coders, such as video encoders and video decoders, are generally configured to code individual pictures of a sequence of pictures using either spatial prediction (or intra-prediction) or temporal prediction (or inter-prediction). More particularly, video coders may predict blocks of a picture using intra-prediction or inter-prediction. Video coders may code residual values for the blocks, where the residual values correspond to pixel-by-pixel differences between a predicted block and an original (that is, uncoded) block. Video coders may transform a residual block to convert values of the residual block from a pixel domain to a frequency domain. Moreover, video coders may quantize transform coefficients of the transformed residual block using a particular degree of quantization indicated by a quantization parameter (QP).

In some cases, block-based coding in this manner may lead to blockiness artifacts between blocks of the picture. That is, after dividing a frame into blocks, coding the blocks, and then decoding the blocks, perceptible artifacts at edges between the blocks may occur. Therefore, video coders may perform various deblocking procedures to remove the blockiness artifacts.

For example, video encoders may encode video data of a frame, then subsequently decode the encoded video data, and then apply deblocking filters to the decoded video data for use as reference video data. Reference data may be data from one or more pictures that a video encoder may use, for example, for inter-prediction of subsequently coded video data. A video encoder may store one or more frames within a reference frame store for inter-prediction.

Such deblocking filtering performed by a video coding device, such as a video encoder or video decoder, prior to storing the decoded video data for use as reference data is generally referred to as "in-loop" filtering. In "in-loop" filtering, a video encoder or decoder may perform the deblocking within a video loop. Video encoders may begin with receiving raw video data, encoding the video data, decoding the encoded video data, deblocking the decoded video data, and storing deblocked pictures in a reference picture memory.

Video decoders may be configured to decode received video data, and then apply the same deblocking filters as was applied by the encoder to the decoded video data. Video decoders may deblock decoded video data for purposes of displaying the video data, e.g., to a user of a device including the decoder, as well as for use as reference video for subsequent video data to be decoded, e.g., for storage in a reference picture memory. By configuring both encoders and decoders to apply the same deblocking techniques, the encoders and decoders can be synchronized, such that deblocking does not introduce error for subsequently coded video data using the deblocked video data for reference.

In general, deblocking involves two steps: determining whether a particular edge between two blocks should be deblocked, and then deblocking edges for which a determination that they should be deblocked is made. The deblocking process is influenced by a boundary filtering strength value, also referred to in this disclosure as a deblocking strength. Beta ($\beta$) and $t_c$ values may be used to determine filtering strength and coefficients used for deblocking decisions, e.g., whether to deblock an edge and, after determining to deblock the edge, a type of filter to use (e.g., strong or weak) and a width of the filter, if a weak filter is selected.

The deblocking procedure may take account of QP values for blocks when deblocking an edge between two blocks. An amount of quantization applied to a block (as indicated by QP) can directly impact the quality of the block. Therefore, deblocking techniques typically take account of the QP of the block, e.g., when determining whether to deblock an edge of the block and how to deblock the edge.

Efforts are currently in progress to develop a new video coding standard, currently referred to as High Efficiency Video Coding (HEVC). The upcoming standard is also referred to as H.265. The HEVC standard may also be referred to as ISO/IEC 23008-HEVC, which is intended to be the standard number for the delivered version of HEVC. The standardization efforts are based on a model of a video coding device referred to as the HEVC Test Model (HM). The HM presumes several capabilities of video coding devices over devices according to, previous coding standards, such as ITU-T H.264/AVC. For example, whereas H.264 provides nine intra-prediction encoding modes, HM provides as many as thirty-five intra-prediction encoding modes.

A recent working Draft (WD) of HEVC, referred to as "HEVC Working Draft 6" or "WD6," is described in document JCTVC-H1003, Bross et al., "High-Efficiency Video Coding (HEVC) text specification draft 6," Joint Collaborative Team on Video Coding (JCT-VC) of ITU-T SG16 WP3 and ISO/IEC JTC1/SC29/WG11, 8th Meeting: San Jose, Calif., USA, February 2012, which is incorporated herein by reference in its entirety, and which as of Oct. 1, 2012, is downloadable from: http://phenix.int-evry.fr/jct/doc_end_user/documents/8_San%20Jose/wg11/JCTVC-H1003-v22.zip Further, another recent working draft of HEVC, Working Draft 8, referred to as "HEVC Working Draft 8" or "WD8," is described in document HCTVC-J1003_d7, Bross et al., "High Efficiency Video Coding (HEVC) Text Specification draft 8," JCT-VC of ITU-T SG16 WP3 and ISO/IEC JTC1/SC29/WG11, 10th Meeting: Stockholm, Sweden, July, 2012, which is incorporated herein by reference in its entirety, and which as of Oct. 1, 2012, is downloadable from: http://phenix.int-evry.fr/jct/doc_end_user/documents/10_Stockholm/wg11/JCTVC-J1003-v8.zip Additionally, a text specification draft of HEVC is described in document JCTVC-LV1003_v28, Bross et al., "High Efficiency Video Coding (HEVC) text specification draft 10 (for FDIS & Consent)," JCT-VC of ITU-T SG 16 WP 3 and ISO/IEC JTC 1/SC 29/WG 11, 12$^{th}$ Meeting: Geneva, Switzerland, Jan. 14-23, 2013, which is incorporated herein by reference in its entirety.

The proposed HEVC standard includes signaling respective offset values for the quantization parameters (QP) that are used for coding the chrominance components Cr and Cb. More particularly, according to the proposed HEVC standard specifies cb_qp_offset and cr_qp_offset syntax elements that are signaled in the picture parameter set (PPS). The syntax elements cb_qp_offset and cr_qp_offset are examples of chrominance quantization parameter offset values that, for the respective chrominance component, specify an offset relative to the luminance QP, and may be used by a video coder to determine the respective chrominance QP (e.g., $QP'_{Cb}$ and $QP'_{Cr}$) for a video block from a luminance QP (e.g., $QP'_Y$) for the video block.

Additionally, the proposed HEVC standard specifies that video coders may process chrominance components with a deblocking filter. In particular, the video coders may process an edge between two video blocks, P and Q, when at least one of these video blocks is intra-coded. When at least one of the two video blocks having a common edge is intra-coded the common edge may be referred to as having a boundary strength Bs=2. For configuring the deblocking filter for a particular chrominance component, the video coder typically looks up the $t_C$ parameter in a table based on the a chrominance QP of the edge for that component, e.g., $QP_{C,Cr}$ or $QP_{C,Cb}$ for the Cr and Cb components, respectively. The $t_C$ parameter may determine the strength of the deblocking filter, and the video coder may apply the $t_C$ parameter in a clipping operation of the chrominance filter.

However, although the proposed HEVC standard specifies chrominance quantization parameter offset values, and the use of such values to determine chrominance QP parameters for blocks of video data, the offset between luminance and chrominance QPs for blocks with a common edge may not be considered when configuring a chrominance component deblocking filter for the edge. For example, in the HEVC WD 6, the chrominance QP for edge, i.e., the chrominance QP used to configure the chrominance component deblocking filter for the edge, may be determined based on the luminance QPs for the video blocks sharing the edge alone, without considering a chrominance quantization parameter offset values. In particular, according to HEVC WD6, the values of $QP_{C,Cr}$ and $QP_{C,Cb}$ used to configure respective deblocking filters for red and blue chrominance are the same, and are determined as follows based on the luma $QP_{Y,P}$ and $QP_{Y,Q}$ values of the P and Q blocks, respectively:

$$QP_C = QP_{C,Cr} = QP_{C,Cb} = QpUV((QP_{Y,P} + QP_{Y,Q} + 1)/2), \quad (1)$$

where QpUV is a function or a table that converts the luma $QP_Y$ in the chroma $QP_{Cr}$ or $QP_{Cb}$ values.

In equation (1), the chrominance QP offset values are not considered. Because the offset values may be large, the video coder may apply deblocking filters with a less than ideal deblocking strength to the chrominance components.

The techniques of this disclosure may improve deblocking functions applied to such edges, and may thereby reduce the appearance of the edge. More particularly, the techniques of this disclosure may improve the deblocking functions applied to the chrominance components at a common edge shared by two blocks of video data. In particular, according to the techniques of this disclosure, a video coder, e.g., a video encoder or video decoder, may calculate a chrominance QP for the edge between two blocks of video data not only based on the luminance QPs for the two blocks of video data, but also based on a chrominance QP offset value. Because a video decoder may, according to the techniques of this disclosure, determine the chrominance QP for the edge based on the chrominance QP offset value, the strength of the deblocking filter, e.g., the value of the $t_C$ parameter, may be more appropriate for the quality levels of the chrominance components of the two blocks of video data that share the common edge.

FIG. 1 is a block diagram illustrating an example video encoding and decoding system 10 that may utilize techniques for deblocking an edge between video blocks. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication. In such cases, computer-readable medium 16 may comprise a wireless communication channel.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface 28. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure, which concern deblocking edges between video blocks, are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20, and an output interface 22. Destination device 14 includes an input interface 28, a video decoder 30, and a display device 32. In other examples, a source device and a destination device may include other components or arrangements. For example, source device 12 may receive video data from an external video source 18, such as an external camera. Likewise, destination device 14 may interface with an external display device, rather than including an integrated display device. Video encoder 20 of source device 12 and video decoder 30 of destination device 14 are examples of video coders that may be configured to apply the techniques of this disclosure for deblocking edges between video blocks.

The illustrated system 10 of FIG. 1 is merely one example. Techniques for deblocking edges between video blocks may be performed by any digital video encoding and/or decoding device. Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video compression standard, such as the forthcoming ITU-T High Efficiency Video Coding (HEVC) standard, also referred to as "H.265." Video encoder 20 and video decoder 30 may conform to the High Efficiency Video Coding Test Model (HM). The techniques of this disclosure, however, are not limited to any particular coding standard. Other examples include MPEG-2 and ITU-T H.263, and ITU-T H.264/AVC (Advanced Video Coding). Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), wireless communication devices that include a video coding device, such as encoder or decoder, discrete logic, software, hardware, firmware or any combinations thereof. Each of video encoder 20 and video decoder 30 may be included in one or more encoders or decoders, either of which may be integrated as part of a combined encoder/decoder (CODEC) in a respective camera, computer, mobile device, subscriber device, broadcast device, set-top box, server, or the like.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

In addition, video encoder 20 may decode encoded pictures, e.g., by inverse quantizing and inverse transforming residual data, and combine the residual data with prediction data. In this manner, video encoder 20 can simulate the decoding process performed by video decoder 30. Both video encoder 20 and video decoder 30, therefore, will have access to substantially the same decoded pictures for use in inter-picture prediction.

In general, video decoder 30 may perform a decoding process that is the inverse of the encoding process performed by video encoder. For example, video decoder 30 may perform entropy decoding using the inverse of the entropy encoding techniques used by video encoder to entropy encode the quantized video data. Video decoder 30 may further inverse quantize the video data using the inverse of the quantization techniques employed by video encoder 20, and may perform an inverse of the transformation used by video encoder 20 to produce the transform coefficients that quantized. Video decoder 30 may then apply the resulting residual blocks to adjacent reference blocks (intra-prediction) or reference blocks from another picture (inter-prediction) to produce the video block for eventual display. Video decoder 30 may be configured, instructed controlled or directed to perform the inverse of the various processes performed by video encoder 20 based on the syntax elements provided by video encoder 20 with the encoded video data in the bitstream received by video decoder 30.

Deblocking may generally be performed following inverse quantization and inverse transformation of video data, whether performed "in loop" by video encoder 20 or video decoder 30, or for eventual display of the blocks of video data by video decoder 30. A deblocking process may be performed "in loop" in the sense that the deblocking filtered pictures may be used as reference pictures for subsequently coded pictures (e.g., pictures coded using inter-prediction).

As discussed above, video encoder 20 and video decoder 30 may be configured according to the HEVC test model (HM). A video encoder or decoder configured in accordance with the HM may generally determine, for each edge separating two PUs or TUs, whether to apply a deblocking filter to deblock the edge. The video encoder or decoder configured according to the techniques of HM may be configured to determine whether to deblock an edge based on an analysis of one or more lines of pixels perpendicular to the edge, for example, a line of 8 pixels. Thus, for example, for a vertical edge, the HM may determine whether to deblock the edge by examining four pixels to the left and four pixels to the right of the edge along a common line. The number of pixels selected generally corresponds to the smallest block for deblocking, for example 8×8 pixels. In this manner, the line of pixels used for analysis may enter only two PUs or TUs, namely the PUs or TUs immediately to the left and to the right of an edge. The line of pixels used for analysis of whether to perform deblocking for an edge is also referred to as a set of support pixels, or simply "support."

Video encoder 20 and video decoder 30 are examples of video coders that may perform deblocking according to the techniques of this disclosure for deblocking the chrominance components at a common edge between first and second decoded blocks of video data. For example, video encoder 20 and video decoder 30 may be configured to decode a first block of data and a second block of video data. Both the first and second blocks may share a common edge. In the case of video encoder 20, video encoder 20 may encode the first block and the second block, which encoder 20 may later decode to generate a reference picture. According to the techniques of this disclosure, video encoder 20 and/or video decoder 30 may determine a strength of a deblocking filter for deblocking the edge and, more particularly, for deblocking chrominance components, based at least in part on a chrominance quantization parameter offset value.

For example, video encoder 20 or video decoder 30 may include the cr_qp_offset and cb_qp_offset values in the computation of the $QP_{C,Cr}$ and $QP_{C,Cb}$ values that are used to look up $t_C$ parameters for deblocking filtering the Cb and Cr chrominance components at an edge between two blocks of video data, as follows:

$$QP_{C,Cr} = QpUV((QP_{Y,P} + QP_{Y,Q} + 1)/2 + cr\_qp\_offset) \qquad (2)$$

$$QP_{C,Cb} = QpUV((QP_{Y,P} + QP_{Y,Q} + 1)/2 + cb\_qp\_offset) \qquad (3)$$

In the above equations, QpUV is a function, table, or the like that converts the luminance quantization parameter $QP_Y$ for a particular block of video data into the chrominance quantization parameters $QP_{Cr}$ or $QP_{Cb}$ values for the video block for Cb and Cr, respectively. $QP_{Y,P}$ and $QP_{Y,Q}$ are the luminance quantization parameter values for the first and second blocks of video data (denoted P and Q), respectively. $(QP_{Y,P} + QP_{Y,Q} + 1)/2$ is the average of the luminance quantization parameter values for the first and second blocks of video data. The chrominance quantization parameter offset values for Cr and Cb are cr_qp_offset and cb_qp_offset, respectively. The chrominance quantization parameter offset values may apply to all blocks of video data in a picture, and may be signaled, e.g., by video encoder 20, in a picture parameter set (PPS).

$QP_{C,Cr}$ and $QP_{C,Cb}$ are examples of chrominance quantization parameter values (for Cr and Cb, respectively) for a common edge between two blocks of video data. Separate $t_C$ values for respective deblocking filters for Cb and Cr may be looked up in a table based on the computed $QP_{C,Cr}$ and $QP_{C,Cb}$. For looking up the $t_C$ values, a constant 2 may be added for Bs=2 and, potentially, a signaled deblocking filter adjustment parameter (tc_offset_div 2) may also be considered, as provided in the currently-proposed HEVC standard. In the examples herein, Cr and Cb may refer to two different types of chrominance values, e.g., two different chrominance components of the video data. The same equations may apply to both to chrominance values, so "Cr" and "Cb" may be generalized and represented by the value "C."

In some examples, the techniques of this disclosure may be compatible with chrominance QP offset signaling methods proposed in the following JCT-VC proposal:

J. Xu, A. Talabatabai, "Consideration on chroma QP range extension for HEVC version 1 and 2," 10$^{th}$ JCT-VC Meeting, Stockholm, Sweden, July 2010, Doc. JCTVC-J0318.

The Xu proposal proposes the following techniques for signaling the $QP_{Cr}$ and $QP_{Cb}$ chroma quantization parameters as an alternative to the techniques described in HEVC WD6:

Method A:

$$QP_{Cb} = \text{Clip3}(0,51,QP_Y + cb\_qp\_offset) \quad (4)$$

$$QP_{Cr} = \text{Clip3}(0,51,QP_Y + cr\_qp\_offset) \quad (5)$$

Method B:

$$QP_{Cb} = \text{Clip3}(0,51,QpUV(QP_Y) + cb\_qp\_offset) \quad (6)$$

$$QP_{Cr} = \text{Clip3}(0,51,QpUV(QP_Y) + cr\_qp\_offset) \quad (7)$$

In the above equations, the $QP_{Cr}$ and $QP_{Cb}$ values are the chrominance quantization parameters for Cr and Cb, respectively, for a particular block of video data. Cb_QP_offset and Cr_QP_offset are the signalled chrominance quantization parameter offset values for Cr and Cb, respectively. Cb_QP_offset and Cr_QP_offset may apply to each block of video data in a picture and may be signaled in a PPS.

When the $QP_{Cr}$ and $QP_{Cb}$ quantization parameters are signaled according to the methods proposed in Xu, the $QP_{C,Cr}$ and $QP_{C,Cb}$ quantization parameter values for a common edge between two blocks that are used to look up $t_C$ parameters for deblocking filtering the Cb and Cr components, may be computed according to the techniques of this disclosure as follows:

Method A*:

$$QP_{C,Cr} = (\text{Clip3}(0,51,QP_{Y,P} + cr\_qp\_offset) + \text{Clip3}(0,51,QP_{Y,Q} + cr\_qp\_offset) + 1)/2 \quad (8)$$

$$QP_{C,Cb} = (\text{Clip3}(0,51,QP_{Y,P} + cb\_qp\_offset) + \text{Clip3}(0,51,QP_{Y,Q} + cb\_qp\_offset) + 1)/2 \quad (9)$$

Or:

$$QP_{C,Cr} = \text{Clip3}(0,51,(QP_{Y,P} + QP_{Y,Q} + 1)/2 + cr\_qp\_offset)) \quad (10)$$

$$QP_{C,Cb} = \text{Clip3}(0,51,(QP_{Y,P} + QP_{Y,Q} + 1)/2 + cb\_qp\_offset)) \quad (11)$$

Method B*:

$$QP_{C,Cr} = (\text{Clip3}(0,51,QpUV(QP_{Y,P}) + cr\_qp\_offset) + \text{Clip}(0,51,QpUV(QP_{Y,Q}) + cr\_qp\_offset) + 1)/2 \quad (12)$$

$$QP_{C,Cb} = (\text{Clip3}(0,51,QpUV(QP_{Y,P}) + cb\_qp\_offset) + \text{Clip}(0,51,QpUV(QP_{Y,Q}) + cb\_qp\_offset) + 1)/2 \quad (13)$$

Or:

$$QP_{C,Cr} = \text{Clip3}(0,51,QpUV((QP_{Y,P} + QP_{Y,Q} + 1)/2) + cr\_qp\_offset) \quad (14)$$

$$QP_{C,Cb} = \text{Clip3}(0,51,QpUV((QP_{Y,P} + QP_{Y,Q} + 1)/2) + cb\_qp\_offset) \quad (15)$$

In other examples, the techniques of this disclosure may be compatible with chrominance QP offset signaling methods proposed in the following JCT-VC proposal:

G. J. Sullivan, S. Kanumuri, J.-Z. Xu, Y. Wu, "Chroma QP range extension," 10th JCT-VC Meeting, Stockholm, Sweden, July 2012, Doc. JCTVC-J0342

During the 10th JCT-VC meeting, the Sullivan proposal was adopted into the text of HEVC WD8. The modification of the HEVC standard based on the Sullivan proposal is related to the conversion table from luminance QP to chrominance QP, which is an example of QpUV in the equations herein. According to the Sullivan proposal, the range of values supported in the mapping of luminance QP to chrominance QP is extended. The variable $QP_{Cbr}$ specifies the value of $QP_{Cb}$ and $QP_{Cr}$ and is given by Table 1 (QpUV) below.

As shown Table 1, the variable $QP_{Cbr}$ is based on the index $qP_I$. The index $qP_I$ in Table 1 corresponds to $qPI_{Cb}$ for chrominance component Cb and $qPI_{Cr}$ for chrominance component $C_r$. As an example, $qPI_{Cb}$ and $qPI_{Cr}$ may be derived as follows:

$$qPI_{Cb} = \text{Clip3}(-QpBdOffsetC, 57, QP_Y + cb\_qp\_offset) \quad (16)$$

$$qPI_{Cr} = \text{Clip3}(-QpBdOffsetC, 57, QP_Y + cr\_qp\_offset) \quad (17)$$

In the above examples, QpBdOffsetC is the value of a chrominance quantization parameter range offset. The value of QpBdOffsetC may be determined based on the bit depth of the chrominance components.

TABLE 1

| | $QpUV(qP_I)$ | | | | | | | | | | | | | | | |
|---|---|---|---|---|---|---|---|---|---|---|---|---|---|---|---|---|
| $qP_I$ | <30 | 30 | 31 | 32 | 33 | 34 | 35 | 36 | 37 | 38 | 39 | 40 | 41 | 42 | 43 | >43 |
| $QP_{Cbr}$ | $=qP_I$ | 29 | 30 | 31 | 32 | 33 | 33 | 34 | 34 | 35 | 35 | 36 | 36 | 37 | 37 | $=qP_I - 6$ |

In addition, the Sullivan proposal introduces slice-level chrominance QP offsets. In particular, the Sullivan proposal introduces slice_qp_delta_cb and slice_qp_delta_cr as slice-level chrominance QP offsets. Whereas cb_qp_offset and cr_qp_offset may be picture-level QP offsets that apply to all video blocks in a picture, each of one or more slices in a picture may be associated with respective slice-level chrominance QP offsets that are associated with all video blocks in a particular slice. The slice-level chrominance QP offsets may be signaled, for example, in a slice header. A video coder may use both the slice-level chrominance QP offsets and the picture-level chrominance QP offsets to determine the chrominance QP values (e.g., $QP_{Cr}$ and $QP_{Cb}$) for a video block from the luminance QP value for the video block.

According to the Sullivan proposal, the slice-level chrominance QP offsets are added into the argument of the clipping function used to determine $qP_{ICb}$ and $qP_{ICr}$ as follows:

$$qP_{ICb}=\text{Clip3}(-\text{QpBdOffset}C,57,QP_Y+cb\_qp\_offset+ \text{slice\_qp\_delta}\_cb) \quad (18)$$

$$qP_{ICr}=\text{Clip3}(-\text{QpBdOffset}C,57,QP_Y+cr\_qp\_offset+ \text{slice\_qp\_delta}\_cr) \quad (19)$$

According to the techniques of this disclosure, a video coder may use the slice-level chrominance QP offset to determine the chrominance quantization parameter values for an edge (e.g., $QP_{C,Cr}$ and $QP_{C,Cb}$) that are used to look up $t_C$ parameters for deblocking filtering the Cb and Cr components as follows:

$$QP_{C,Cr}=QpUV((QP_{Y,P}+QP_{Y,Q}+1)/2+cr\_qp\_offset+ \text{slice\_qp\_delta}\_cr) \quad (20)$$

$$QP_{C,Cb}=QpUV((QP_{Y,P}+QP_{Y,Q}+1)/2+cb\_qp\_offset+ \text{slice\_qp\_delta}\_cb) \quad (21)$$

Again, QpUV is a function or a table used by a video coder for converting a luminance quantization parameter $QP_Y$ into chrominance quantization parameter values $QP_{Cr}$ or $QP_{Cb}$. QpUV may also be implemented by mathematical equations and/or conditions. In one example, clipping may be applied before looking up the $t_C$ parameters in the QpUV table.

Equations 20 and 21 above may be used by a video coder to determine the quantization parameter values for the edge for determining the strength of the deblocking filter when both of the first and second blocks (P and Q) having the common edge are within the same slice. In some examples, when blocks P and Q belong to different slices, a video coder may take the values of slice_qp_delta_cr and slice_qp_delta_cb from one of the slices. From which slice to take the slice-level chrominance quantization parameter offset values may be predetermined, or signaled by video encoder 20. In one example, the values of slice_qp_delta_cr and slice_qp_delta_cb may be taken from the slice containing block Q.

In other examples when blocks P and Q belong to different slices, a video coder may determine the slice-level QP offset value to be an average or other mathematical combination of the respective slice level QP offset values for the two slices. In some example, a video coder may compute the $QP_{C,Cr}$ and $QP_{C,Cb}$ values that are used to look up $t_C$ parameters for deblocking filtering the Cb and Cr components as follows:

$$QP_{C,Cr}=QpUV((QP_{Y,P}+\text{slice\_qp\_delta}\_cr\_P+QP_{Y,Q}+ \text{slice\_qp\_delta}\_cr\_Q+1)/2+cr\_qp\_offset) \quad (22)$$

$$QP_{C,Cb}=QpUV((QP_{Y,P}+\text{slice\_qp\_delta}\_cb\_P+QP_{Y,Q}+ \text{slice\_qp\_delta}\_cb\_Q+1)/2+cb\_qp\_offset) \quad (23)$$

In the above example equations 21 and 22, slice_qp_delta_cr_P and slice_qp_delta_cr_Q are the Cr component QP offsets for the slices including video blocks P and Q, respectively. In the above example equations 21 and 22, slice_qp_delta_cb_P and slice_qp_delta_cb_Q are the Cb component QP offsets for slices including P and Q, respectively.

In a similar manner the slice-level chrominance QP offsets may be introduced into the eight equations (example equations 8-15) for computing $QP_{C,Cr}$ and $QP_{C,Cb}$ according to the techniques of this disclosure described above with respect to Method A* and Method B* above.

For example, equation 8 may be modified as follows:

$$QP_{C,Cr}=\text{Clip3}(0,51,(QP_{Y,P}+QP_{Y,Q}+1)/2+cr\_qp\_offset+\text{slice\_qp\_delta}\_cb)) \quad (24)$$

In a similar manner, slice-level chrominance QP offsets may be added to the picture-level chrominance QP offsets of the seven remaining equations described above with respect to Method A* and Method B*. For the sake of brevity, each of the equations is not reproduced herein.

In another example, when the $QP_{Cr}$ and $QP_{Cb}$ chrominance quantization parameters are signaled using slice-level chrominance QP offsets, a video coder may compute the chrominance quantization parameter values for the edge, e.g., $QP_{C,Cr}$ and $QP_{C,Cb}$, that are used to look up $t_C$ parameters for deblocking filtering the Cb and Cr components as follows:

$$QP_{C,Cr}=(QpUV(QP_{Y,P}+cr\_qp\_offset+\text{slice\_qp\_delta}\_cr\_P)+QpUV(QP_{Y,Q}+cr\_qp\_offset+\text{slice\_qp}\_\text{delta}\_cr\_Q)+1)/2 \quad (25)$$

$$QP_{C,Cb}=(QpUV(QP_{Y,P}+cb\_qp\_offset+\text{slice\_qp\_delta}\_cb\_p)+QpUV(QP_{Y,Q}+cb\_qp\_offset+\text{slice\_qp}\_\text{delta}\_cb\_Q)+1)/2 \quad (26)$$

In the above example equations 25 and 26, $QP_{Y,P}$ and $QP_{Y,Q}$ are the respective luminance QP values of the first and second video blocks (denoted P and Q) that share the common edge.

Additionally, while the HEVC WD8 main profile currently supports the 4:2:0 color format, the 4:2:2 and 4:4:4 formats may be included in future HEVC extensions. As described above, the cb_qp_offset and cr_qp_offset syntax elements in the PPS and/or the slice-level chrominance QP offsets may be used to determine the value of $QP_{C,Cr}$ and $QP_{C,Cb}$. $QP_{C,Cr}$ and $QP_{C,Cb}$ may be used to look up $t_C$ parameters for deblocking filtering the Cb and Cr components. Because HEVC extensions may support additional color formats, a determination whether to include PPS and/or slice-level chrominance offsets when configuring a deblocking filter may be dependent on a color format. In this manner, $QP_{C,Cr}$ and $QP_{C,Cb}$ may be made dependent on the color format. In some examples according to the techniques of this disclosure, PPS and/or slice-level chrominance offsets may be included when configuring deblocking filtering 4:2:2 and/or 4:4:4 chrominance components.

The HEVC high-level syntax parameter chroma_format_idc included in the Sequence Parameter Set (SPS) determines the chroma format. Therefore, the inclusion of the PPS- and/or slice-level chroma QP offsets to determine the $QP_{C,Cr}$ and $QP_{C,Cb}$ values may be made dependent on the chroma_format_idc syntax element. Further, the inclusion of the PPS- and/or slice-level chrominance QP offsets to determine the $QP_{C,Cr}$ and $QP_{C,Cb}$ values may be made dependent on a profile and/or level for the video data included in the blocks of video data that share the common edge.

Video encoder 20 and video decoder 30 each may implement any of the techniques described herein for deblocking filtering of chrominance components at a common edge between two blocks of video data. For example, video encoder 20 and video decoder 30 may each employ any of the example equations discussed above to determine a chrominance QP value for the edge, which in turn may be used to determine a strength of a deblocking filter, e.g., a $t_c$ value, for a chrominance component.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). An apparatus including video encoder 20 and/or video decoder 30 may comprise an integrated circuit, a microprocessor, and/or a wireless communication device, such as a cellular telephone.

Figure 2:
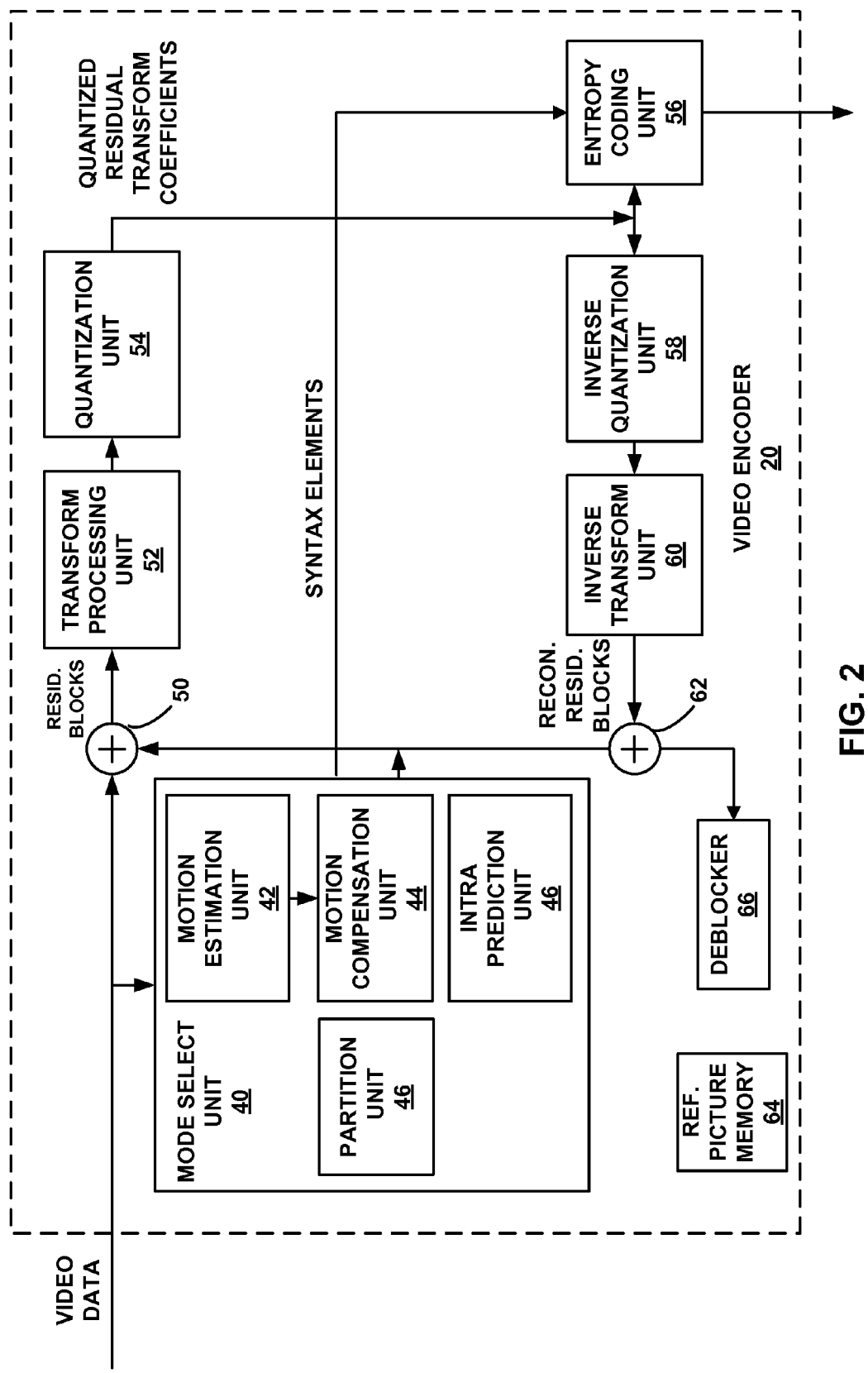
FIG. 2 is a block diagram illustrating an example of a video encoder that may implement techniques for deblocking edges between video blocks.

FIG. 2 is a block diagram illustrating an example of video encoder 20 that may implement techniques for deblocking edges between video blocks. Video encoder 20 may perform intra- and inter-coding of blocks within video frames, including CUs, or sub-CUs of CUs. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to any of several spatial based compression modes and inter-modes such as uni-directional prediction (P-mode) or bi-directional prediction (B-mode) may refer to any of several temporal-based compression modes. Although components for inter-mode encoding are depicted in FIG. 2, it should be understood that video encoder 20 may further include components for intra-mode encoding. However, such components are not illustrated for the sake of brevity and clarity.

As shown in FIG. 2, video encoder 20 receives a current video block within a video frame to be encoded. In the example of FIG. 2, video encoder 20 includes mode select unit 40, reference picture memory 64, summer 50, transform processing unit 52, quantization unit 54, entropy encoding unit 56, and deblocker 66. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62.

In accordance with the techniques of this disclosure, video encoder 20 includes deblocker 66 that selectively filters the output of summer 62. In particular, deblocker 66 receives reconstructed video data from summer 62, which corresponds to predictive data received from either motion compensation unit 44 or intra-prediction unit 46, added to inverse quantized and inverse transformed residual data. In this manner, deblocker 66 receives decoded blocks of video data, e.g., CUs of an LCU and/or LCUs of a slice or frame. In general, deblocker 66 selectively filters the blocks of video data to remove blockiness artifacts. Deblocker 66 is described in greater detail below.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal compression. An intra prediction unit may also perform intra-predictive coding of the received video block relative to one or more neighboring blocks in the same frame or slice as the block to be coded to provide spatial compression. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference picture. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luminance components, and motion compensation unit 44 uses motion vectors calculated based on the luminance components for both chrominance components and luminance components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64.

In accordance with the techniques of this disclosure, video encoder 20 includes deblocker 66 that selectively filters the output of summer 62. Deblocker 66 performs any or all of the techniques of this disclosure to deblock the output of summer 62, that is, the reconstructed video blocks. The reconstructed video blocks, as filtered by deblocker 66, may be used by motion estimation unit 42 and motion compensation unit 44 as a reference block to inter-code a block in a subsequently-coded picture.

In particular, deblocker 66 receives reconstructed video data from summer 62, which corresponds to predictive data received from either motion compensation unit 44 or intra-prediction unit 46, added to inverse quantized and inverse transformed residual data. In this manner, deblocker 66 receives decoded blocks of video data, e.g., CUs of an LCU, LCUs of a slice or frame, PUs of a CU, and/or TUs of a CU. In general, deblocker 66 selectively filters the blocks of video data.

Deblocker 66 is generally configured to analyze pixels of two neighboring blocks (e.g., two CUs, PUs, or TUs) near an edge between the two blocks to determine whether to deblock the edge. More particularly, deblocker 66 may alter the values of the pixels near the edge when a high-frequency change in values is detected. Deblocker 66 may also be configured to perform any or all of the techniques of this disclosure.

Deblocker 66 may include predefined adapted sets of support, or calculate adapted sets of support on the fly. Deblocker 66 may thereby avoid including nearby edges into the computation of the deblocking decisions or deblocking filtering, and to avoid filter result dependencies between nearby edges. Deblocker 66 may also skip support adaptation when narrow blocks on either or both sides of an edge under consideration for deblocking are perpendicular to the edge. When at least one narrow non-square partition or transform is parallel to the edge to be deblocked, deblocker 66 may adapt deblocking decision functions and/or deblocking filters to avoid interdependencies between filtering of nearby edges and to avoid including nearby edges in the deblocking decisions and filtering.

Deblocker 66 may, for each of one or more chrominance components of video data, calculate a chrominance QP value for a common edge between two blocks of video data based on respective luminance QP values for the two video blocks, as well as a chrominance QP offset value for the chrominance component. Deblocker 66 may further determine a strength of a deblocking filter for the common edge based on the chrominance QP value for the chrominance component, and apply the filter to the chrominance component to deblock the edge. For example, deblocker 66 may compute $QP_{C,Cr}$ and $QP_{C,Cb}$ values that are used to look up $t_C$ parameters for deblocking filtering according to the techniques described herein, e.g., according to any of the equations described above. In some examples, deblocker 66 may calculate a chrominance QP value for a common edge between two blocks of video data by calculating an average of the first and second luminance QP values for the two video blocks, and applying the chrominance QP offset value to the average, e.g., as illustrated by equations 2, 3 and 8-15.

In some examples, the chrominance QP offset value for a chrominance component may be a picture-level chrominance QP offset value, which may apply to all video blocks of a picture, and may be signaled in a PPS. In some examples, deblocker 66 may additionally determine a slice-level chrominance QP offset value for the chrominance component, which may apply to all video blocks in a given slice, and may be signaled in a slice-header. The slice-level chrominance QP offset may be applied in a manner similar to the picture-level chrominance QP offset value, e.g., by summation with the picture-level chrominance QP offset value and the average of the luminance QP values for the two blocks as illustrated by equations 20 and 21.

In some examples, the two video blocks that share a common edge are located within different slices. In such examples, the two video blocks may be associated with different slice-level QP offset values, e.g., different values for slice_qp_delta_cr and slice_qp_delta_cb. In some examples, deblocker 66 may be configured to select the slice-level QP offset values for one of the blocks for application to determine the chrominance QP values for the edge according to the techniques described herein. In other examples, deblocker 66 may be configured to average or otherwise combine the slice-level QP offset values for the two blocks to determine combined slice-level QP offset values, and may then apply the combined slice-level QP offset values to determine the chrominance QP values for the edge according to the techniques described herein.

In this manner, video encoder 20 of FIG. 2 represents an example of a video encoder configured, according to the techniques of this disclosure to determine a chrominance QP value for a common edge between two decoded blocks of video data based on a chrominance QP offset value, and determine a strength for a deblocking filter based on the chrominance QP value for the edge.

Figure 3:
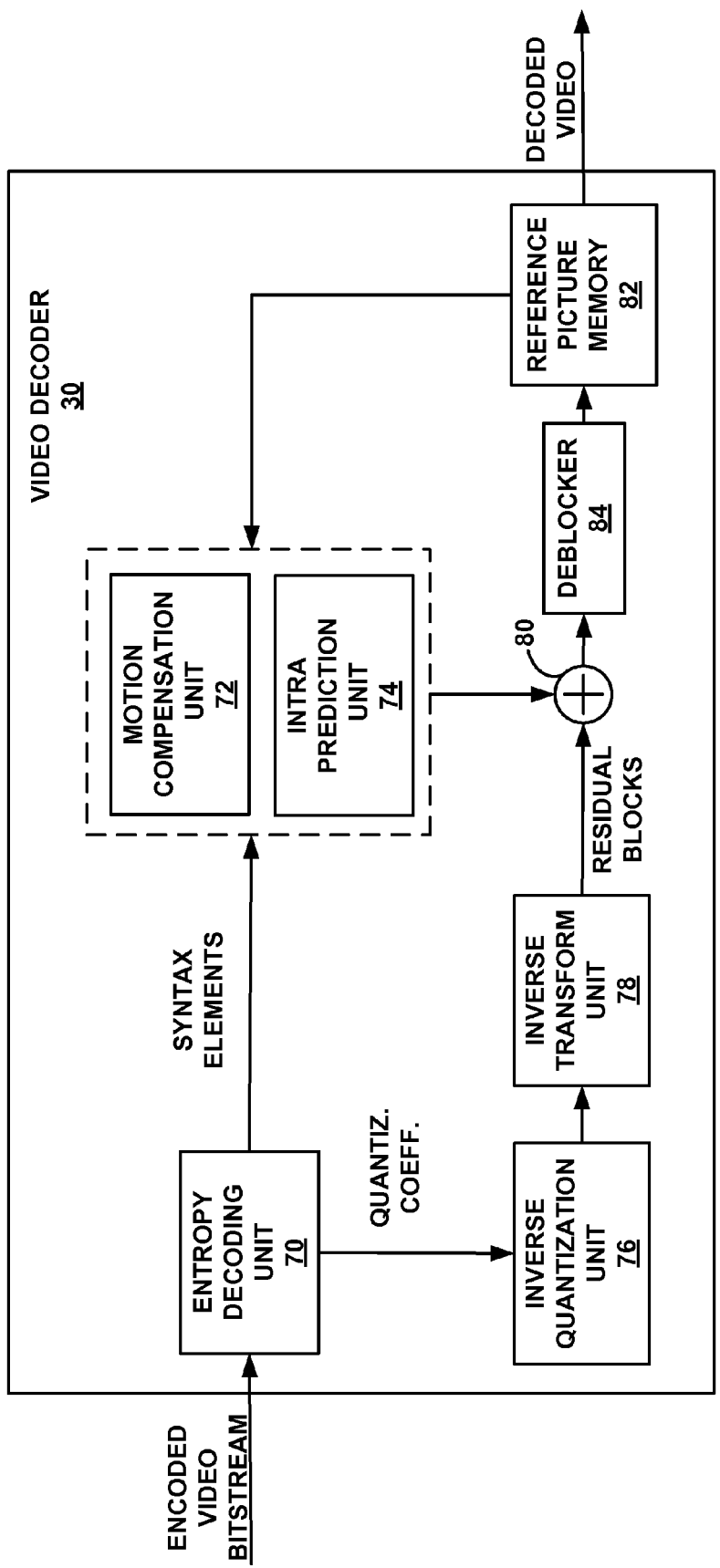
FIG. 3 is a block diagram illustrating an example of a video decoder that may implement techniques for deblocking an edge between video blocks.

FIG. 3 is a block diagram illustrating an example of video decoder 30, which decodes an encoded video sequence. In the example of FIG. 3, video decoder 30 includes an entropy decoding unit 70, motion compensation unit 72, intra prediction unit 74, inverse quantization unit 76, inverse transformation unit 78, reference frame store 82, summer 80, and deblocker 84. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference picture lists, List 0 and List 1, using default construction techniques based on reference pictures stored in reference picture memory 92.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 80. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform unit 78 with the corresponding predictive blocks generated by motion compensation unit 82. Summer 80 represents the component or components that perform this summation operation.

Deblocker 84 may be configured to perform any or all of the techniques of this disclosure to deblock the output of summer 80. Deblocker 84 may selectively deblock CUs, including TUs and PUs of CUs, received from summer 80 in accordance with any or all of the techniques of this disclosure. Deblocker 84 may conform substantially to deblocker 66 (FIG. 2), in that deblocker 84 may be configured to perform any or all of the techniques described with respect to de-blocker 66. The decoded video blocks in a given frame or picture, as filtered by deblocker 84, are then stored in reference picture memory 92, which stores reference pictures used for subsequent motion compensation. Reference picture memory 82 also stores decoded video for later presentation on a display device, such as display device 32 of FIG. 1.

For example, deblocker 84 may compute $QP_{C,Cr}$ and $QP_{C,Cb}$ values that are used to look up $t_C$ parameters for deblocking filtering according to the techniques described herein, e.g., according to any of the equations described above. In some examples, deblocker 84 may calculate a chrominance QP value for a common edge between two blocks of video data by calculating an average of the first and second luminance QP values for the two video blocks, and applying the chrominance QP offset value to the average, e.g., as illustrated by equations 2, 3 and 8-15.

In some examples, the chrominance QP offset value for a chrominance component may be a picture-level chrominance QP offset value, which may apply to all video blocks of a picture, and may be signaled in a PPS. In some examples, deblocker 84 may additionally or alternatively determine a slice-level chrominance QP offset value for the chrominance component, which may apply to all video blocks in a given slice, and may be signaled in a slice-header. The slice-level chrominance QP offset may be applied in a manner similar to the picture-level chrominance QP offset value, e.g., by summation with the picture-level chrominance QP offset value and the average of the luminance QP values for the two blocks as illustrated by equations 20 and 21.

In some examples, the two video blocks that share a common edge are located within different slices. In such examples, the two video blocks may be associated with different slice-level QP offset values, e.g., different values for slice_qp_delta_cr and slice_qp_delta_cb. In some examples, deblocker 84 may be configured to select the slice-level QP offset values for one of the blocks for application to determine the chrominance QP values for the edge according to the techniques described herein. In other examples, deblocker 84 may be configured to average or otherwise combine the slice-level QP offset values for the two blocks to determine combined slice-level QP offset values, and may then apply the combined slice-level QP offset values to determine the chrominance QP values for the edge according to the techniques described herein.

In this manner, video decoder 30 of FIG. 3 represents an example of a video decoder configured, according to the techniques of this disclosure, to determine a chrominance QP value for a common edge between two decoded blocks of video data based on a chrominance QP offset value, and determine a strength for a deblocking filter based on the chrominance QP value for the edge.

Figure 4:
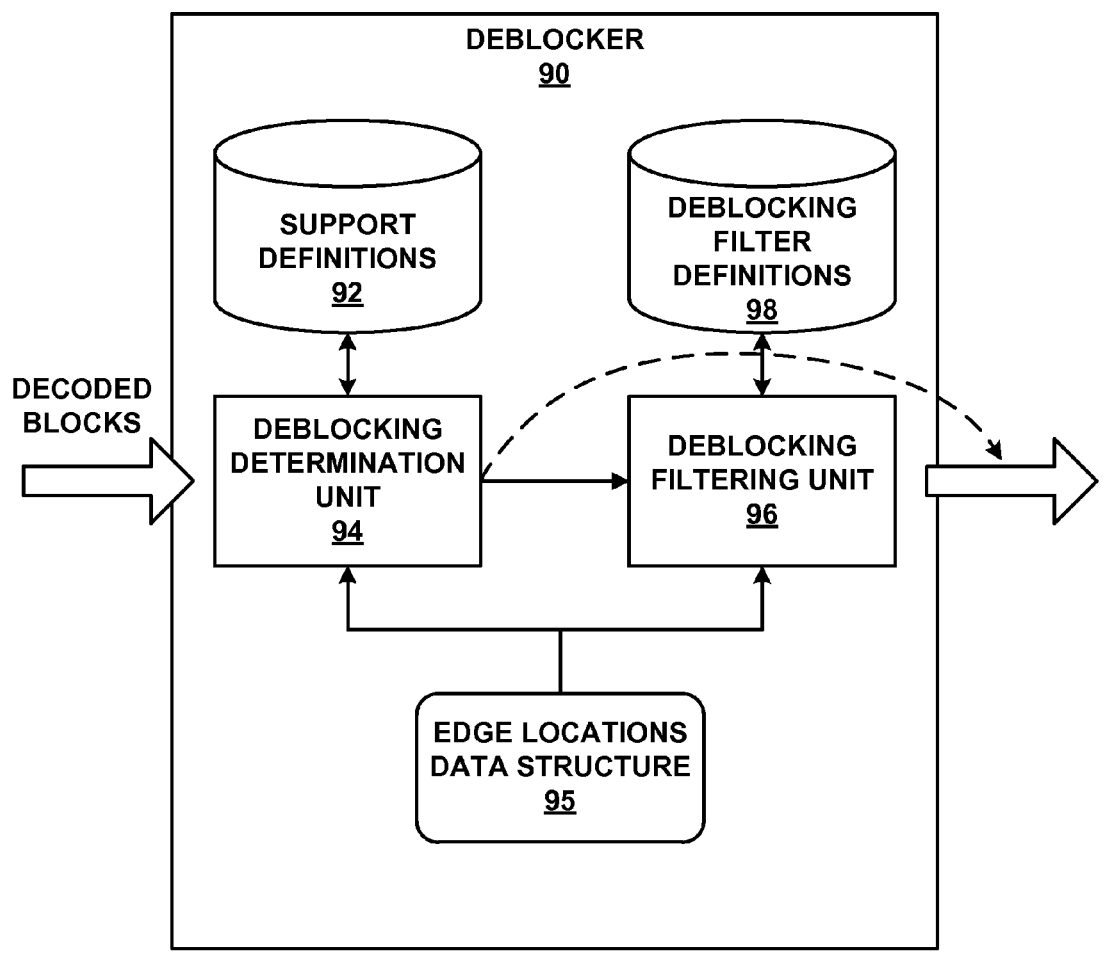
FIG. 4 is a block diagram illustrating components of an example deblocker.

FIG. 4 is a block diagram illustrating components of an example deblocker 90. In general, either or both of deblocker 66 (FIG. 2) and deblocker 84 (FIG. 3) may include components substantially similar to those of deblocker 90. Other video coding devices, such as video encoders, video decoders, video encoder/decoders (CO-DECs), and the like may also include components substantially similar to deblocker 90. Deblocker 90 may be implemented in hardware, software, or firmware. When implemented in software or firmware, corresponding hardware (such as one or more processors or processing units and memory for storing instructions for the software or firmware) may also be provided.

In the example of FIG. 4, deblocker 90 includes deblocking determination unit 94, support definitions 92, deblocking filtering unit 96, deblocking filter definitions 98, and edge locations data structure 95. Any or all of the components of deblocker 90 may be functionally integrated. The components of deblocker 90 are illustrated separately only for purposes of illustration.

In general, deblocker 90 receives data for decoded blocks, e.g., from a summation component, such as unit 62 (FIG. 2) or unit 80 (FIG. 3) that combines prediction data with residual data for the blocks. The data may further include an indication of how the blocks were predicted. In some examples, deblocker 90 is configured to receive data including a decoded LCU and a CU quadtree for the LCU, where the CU quadtree describes how the LCU is partitioned into CUs and describes the prediction modes for leaf-node CUs. The data may also include information indicating partitioning of leaf-node CUs into PUs and TUs, which may further indicate whether the PUs are asymmetric motion partitions and/or whether the TUs are nonsquare quadtree transform (NSQT) partitions. A TU quadtree may indicate whether TUs are NSQT partitions and/or whether TUs correspond to asymmetric motion partition PUs.

Deblocking determination unit 94 generally determines whether, for two neighboring blocks (for example, two CUs, PUs, or TUs), an edge between the two blocks should be deblocked. Deblocking determination unit 94 may determine locations of edges using edge locations data structure 95.

In general, deblocking determination unit 94 is configured with one or more deblocking determination functions. A deblocking determination function may determine whether or not to apply deblocking to a particular edge based on a result of the function. The functions may include a plurality of coefficients applied to lines of pixels that cross the edge between blocks, such as two CUs. For example, the functions may be applied to a line of eight pixels that is perpendicular to the edge, where four of the pixels are in one of the two blocks and the other four pixels are in the other of the two blocks. Depending on the shape and size of the support functions, the functions may be adapted to use greater or fewer pixels. Support definitions 92 define support for the functions. In general, the "support" corresponds to the pixels to which the functions are applied.

Deblocking determination unit 94 may be configured to apply one or more deblocking determination functions to one or more sets of support, as defined by support definitions 92, to determine whether a particular edge between two blocks of video data should be deblocked. In some examples, however, deblocking determination unit 94 is configured to skip application of the deblocking determination functions to a particular edge or to adapt deblocking decision functions and/or deblocking filters for the particular edge.

The dashed line originating from deblocking determination unit 94 represents data for blocks being output without being filtered. In cases where deblocking determination unit 94 determines that an edge between two blocks should not be filtered, deblocker 90 may output the data for the blocks without altering the data. That is, the data may bypass deblocking filtering unit 96. As an example, deblocker 90 may determine that two blocks should not be filtered if they have overlapping sets of support for a de-blocking function and/or for a de-blocking function. On the other hand, when deblocking determination unit 94 determines that an edge should be deblocked, deblocking determination unit 94 may cause deblocking filtering unit 96 to filter values for pixels near the edge, to deblock the edge.

Deblocker 90 may be configured to analyze lines of pixels perpendicular to and intersecting the respective edge segments to determine whether to deblock any or all of the edge segments, whether to apply a weak or strong filter to the edge segments to be deblocked, and widths of weak filters. In particular, deblocking determination unit 94 may be configured to make these various determinations (i.e., whether to deblock an edge segment, whether to apply a strong or weak filter to deblock the edge segment, and a width of a weak filter when a weak filter is selected) based at least in part on the deblocking parameters, e.g., β and $t_c$. Support definitions 92 includes data defining the lines of pixels to be used to make these determinations.

Deblocking filtering unit 96 retrieves definitions of deblocking filters from deblocking filter definitions 98 for edges to be deblocked, as indicated by deblocking determination unit 94. For edges between non-square blocks, deblocking filtering unit 96 may retrieve adapted deblocking filters from deblocking filter definitions 98, such that the filters do not cross additional boundaries. In general, filtering of an edge uses values of pixels from the neighborhood of a current edge to be deblocked. Therefore, both deblocking decision functions and deblocking filters may have a certain support region on both sides of an edge. By applying a deblocking filter to pixels in the neighborhood of an edge, deblocking filtering unit 96 may smooth the values of the pixels such that high frequency transitions near the edge are dampened. In this manner, application of deblocking filters to pixels near an edge may reduce blockiness artifacts near the edge.

Deblocking filter definitions 98 define various deblocking filters, such as strong filters and weak filters of various widths. The widths of weak filters may define weak filters that modify one pixel on each side of a boundary, two pixels on each side of a boundary, and one pixel on one side and two pixels on the other side of a boundary. The number of pixels modified by a deblocking filter is not necessarily the same as the number of pixels used as input to the deblocking filter. Thus, deblocking filter definitions 98 may include data defining a number of inputs to a deblocking filter, as well as data defining a number of pixels to be modified using the inputs. In general, a deblocking filter is defined by input pixels and filter coefficients to be mathematically applied to the input pixels to produce modified values of certain pixels.

In some examples according to the techniques of this disclosure, a video decoding device, such as video encoder 20 or video decoder 30 of FIGS. 1-3, may include a deblocking unit conforming substantially to the example of deblocker 90. Video encoder 20 or video decoder 30 may be configured to apply a deblocking filter or function when a decision function indicates that a common edge between two blocks should be deblocked.

For example, deblocker 90 may compute $QP_{C,Cr}$ and $QP_{C,Cb}$ values that are used to look up $t_C$ parameters for deblocking filtering according to the techniques described herein, e.g., according to any of the equations described above. As discussed above, the $t_c$ parameter may impact the strength of the deblocking filter applied by deblocker 90. In some examples, deblocker 90 may calculate a chrominance QP value for a common edge between two blocks of video data by calculating an average of the first and second luminance QP values for the two video blocks, and applying the chrominance QP offset value to the average, e.g., as illustrated by equations 2, 3 and 8-15.

In some examples, the chrominance QP offset value for a chrominance component may be a picture-level chrominance QP offset value, which may apply to all video blocks of a picture, and may be signaled in a PPS. In some examples, deblocker 90 may additionally or alternatively determine a slice-level chrominance QP offset value for the chrominance component, which may apply to all video blocks in a given slice, and may be signaled in a slice-header. The slice-level chrominance QP offset may be applied in a manner similar to the picture-level chrominance QP offset value, e.g., by summation with the picture-level chrominance QP offset value and the average of the luminance QP values for the two blocks as illustrated by equations 20 and 21.

In some examples, the two video blocks that share a common edge are located within different slices. In such examples, the two video blocks may be associated with different slice-level QP offset values, e.g., different values for slice_qp_delta_cr and slice_qp_delta_cb. In some examples, deblocker 90 may be configured to select the slice-level QP offset values for one of the blocks for application to determine the chrominance QP values for the edge according to the techniques described herein. In other examples, deblocker 90 may be configured to average or otherwise combine the slice-level QP offset values for the two blocks to determine combined slice-level QP offset values, and may then apply the combined slice-level QP offset values to determine the chrominance QP values for the edge according to the techniques described herein.

Figure 5:
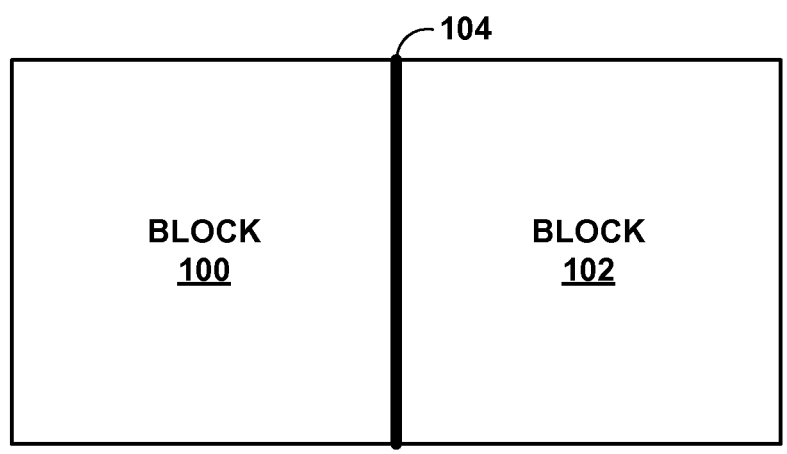
FIG. 5 is a conceptual diagram illustrating an edge formed by two neighboring video blocks.

FIG. 5 is a conceptual diagram illustrating an edge 104 formed by two neighboring blocks 100, 102. Blocks 100, 102 may correspond to blocks P and Q described above. Although the example of FIG. 5 shows blocks 100, 102 in a side-by-side arrangement, it should be understood that above-and-below neighboring blocks may also form an edge that can be deblocked in accordance with the techniques of this disclosure. Moreover, although blocks 100, 102 are shown as being the same size, the neighboring blocks forming an edge are not necessarily the same size.

Blocks 100, 102 may represent transform blocks of respective transform units (TUs). Accordingly, blocks 100, 102 may be associated with respective quantization parameter (QP) values. Additionally, blocks 100 and 102 may each include luminance components, as well as one or more chrominance components, e.g., Cr and Cb.

In accordance with the techniques of this disclosure, a deblocker, such as deblocker 66 (FIG. 2), deblocker 84 (FIG. 3), or deblocker 90 (FIG. 4) may be configured to determine a chrominance QP value (for each of one or more chrominance components) for deblocking edge 104 between blocks 100 and 102 based not only on the respective luminance QPs for blocks 100 and 102, but also on a chrominance QP offset value. For example, the deblocker may apply the chrominance QP offset value to an average of the luminance QP values of blocks 100 and 102, e.g., according to any of equations 2, 3 and 8-15. The deblocker may then use the chrominance QP value for edge 104 for a particular chrominance component to determine the strength of the deblocking filter to apply to the edge for the particular chrominance component, e.g., to determine the $t_c$ value.

In some examples, blocks 100 and 102 may be included in different slices. In such examples, blocks 100 and 102 may be associated with different slice-level QP offset values, e.g., different values for each of slice_qp_delta_cr and slice_qp_delta_cb. In some examples, a deblocker may be configured to select the slice-level QP offset values associated with one of blocks 100 and 102 for application to determine the chrominance QP values for edge 104 according to the techniques described herein. In other examples, the deblocker may be configured to average or otherwise mathematically combine the slice-level QP offset values for the two blocks to determine combined slice-level QP offset values, and may then apply the combined slice-level QP offset values to determine the chrominance QP values for the edge according to the techniques described herein.

Figure 6:
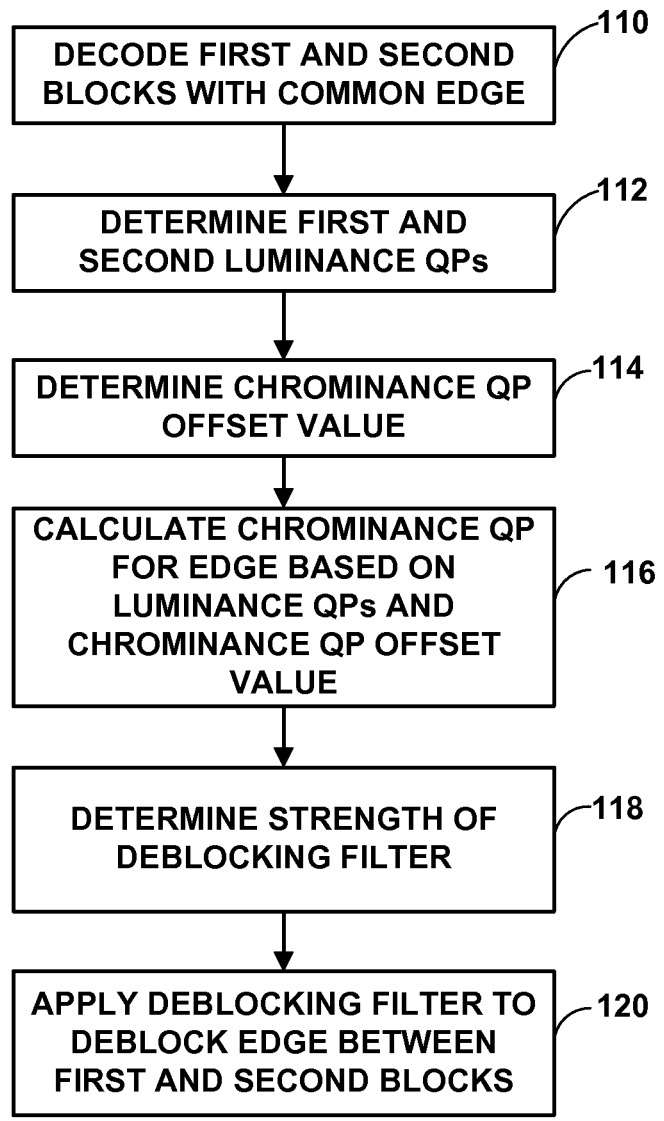
FIG. 6 is a flowchart illustrating an example method for performing deblocking during a video coding process in accordance with the techniques of this disclosure.

FIG. 6 is a flowchart illustrating an example method for performing deblocking during a video coding process in accordance with the techniques of this disclosure. The example method of FIG. 6 may be performed by a deblocker, such as deblocker 66 (FIG. 2), deblocker 84 (FIG. 3), or deblocker 90 (FIG. 4). Furthermore, the example method of FIG. 6 may be performed by a video coder, which may be a video encoder or a video decoder, such as video encoder 20 or video docoder 30 (FIGS. 1-3).

According to the example method of FIG. 6, a video coder decodes first and second blocks of video data (e.g., blocks Q and P referred to above, or blocks 100 and 102 of FIG. 5) having a common edge (e.g., edge 104 of FIG. 5) (110). The video coder, e.g., a deblocker of the video coder, may determine first and second luminance QPs for the first and second video blocks, respectively, e.g., $QP_{Y,P}$ and $QP_{Y,Q}$ (112). The video coder, e.g., deblocker, may also determine a chrominance QP offset value for a particular one of one or more chrominance components of the video blocks, e.g., cr_qp_offset for the Cr component, or cb_qp_offset for the Cb component (114).

For each of the chrominance components, the video coder, e.g., deblocker, calculates a chrominance QP value for the common edge between the first and second blocks based on the respective luminance QPs for the first and second blocks, as well as the chrominance QP offset value for the chrominance component (116). In some examples, the video coder calculates the chrominance QP value for the common edge by averaging the luminance QP values for the two video blocks, and applying the chrominance QP offset value to the average. In some examples, the video coder calculates the chrominance QP value for the common edge using any of the example equations 2, 3 and 8-15 discussed above.

The video coder, e.g., deblocker of the video coder, may then determine a strength of a deblocking filter to be applied to the common edge for the chrominance component, e.g., Cr or Cb, based on the chrominance QP value for edge that was calculated for the particular chrominance component (118). As discussed herein, the determination of the strength of the deblocking filter may include determining the $t_c$ parameter value based on the chrominance QP value for edge that was calculated for the particular chrominance component. The video coder, e.g., deblocker of the video coder, may then apply the deblocking filter with the determined strength to deblock the common edge between the first and second blocks (120).

In this manner, the method of FIG. 6 represents an example of a method including determining a chrominance QP value for a common edge between two decoded blocks of video data based on a chrominance QP offset value, and determining a strength for a deblocking filter based on the chrominance QP value for the edge.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for processing video data, the method comprising:
    decoding a first block of video data and a second block of video data, wherein the first block of video data and the second block of video data share a common edge;
    determining a first luminance quantization parameter for the first block of video data and a second luminance quantization parameter for the second block of video data;
    for each of one or more chrominance components, determining a chrominance quantization parameter offset value;
    for each of the one or more chrominance components, calculating a chrominance quantization parameter used to configure a chrominance component deblocking filter for the common edge based on the first luminance quantization parameter for the first block of video data, the second luminance quantization parameter for the second block of video data, and the chrominance quantization parameter offset value for the chrominance component;
    for each of the one or more chrominance components, determining a strength for the chrominance component deblocking filter for the common edge based on the chrominance quantization parameter used to configure the chrominance component deblocking filter for the common edge; and
    for each of the one or more chrominance components, applying the chrominance component deblocking filter according to the determined strength to deblock the common edge,
    wherein calculating the chrominance quantization parameter used to configure the chrominance component deblocking filter for the common edge comprises:
        calculating an average of the first luminance quantization parameter for the first block of video data and the second luminance quantization parameter for the second block of video data; and
        applying the chrominance quantization parameter offset value to the average.

2. The method of claim 1, wherein calculating the chrominance quantization parameter used to configure the chrominance component deblocking filter for the common edge comprises calculating:

$$QpUV((QP_{Y,P}+QP_{Y,Q}+1)/2+c\_qp\_offset),$$

wherein QpUV comprises a table that specifies values of the chrominance quantization parameter used to configure the chrominance component deblocking filter for the common edge based on values of $(QP_{Y,P}+QP_{Y,Q}+1)/2+c\_qp\_offset$,
wherein c_qp_offset comprises the chrominance quantization parameter offset value,
wherein $QP_{Y,P}$ comprises the first luminance quantization parameter for the first block of video data and $QP_{Y,Q}$ comprises the second luminance quantization parameter for the second block of video data, and
wherein $(QP_{Y,P}+QP_{Y,Q}+1)/2$ comprises the average of the first luminance quantization parameter for the first block of video data and the second luminance quantization parameter for the second block of video data.

3. The method of claim 1, wherein calculating the chrominance quantization parameter used to configure the chrominance component deblocking filter for the common edge comprises calculating:

$$Clip3(0,51,(QP_{Y,P}+QP_{Y,Q}+1)/2+c\_qp\_offset)),$$

wherein c_qp_offset comprises the chrominance quantization parameter offset value,
wherein $QP_{Y,P}$ comprises the first luminance quantization parameter for the first block of video data and $QP_{Y,Q}$ comprises the second luminance quantization parameter for the second block of video data, and
wherein $(QP_{Y,P}+QP_{Y,Q}+1)/2$ comprises the average of the first luminance quantization parameter for the first block of video data and the second luminance quantization parameter for the second block of video data.

4. The method of claim 1, wherein the chrominance quantization parameter offset value is signaled in a picture parameter set.

5. The method of claim 1, further comprising at least one of:
    applying the chrominance quantization parameter offset value to the first luminance quantization parameter for the first block of video data to determine a first chrominance quantization parameter for the first block of video data; or
    applying the chrominance quantization parameter offset value to the second luminance quantization parameter for the second block of video data to determine a second chrominance quantization parameter for the second block of video data.

6. The method of claim 1, wherein determining a strength for the deblocking filter for the common edge based on the chrominance quantization parameter used to configure the chrominance component deblocking filter for the common edge comprises determining a first parameter based on the chrominance quantization parameter, wherein the first parameter is applied in a clipping operation of the deblocking filter.

7. The method of claim 1,
    wherein the chrominance quantization parameter offset value comprises a picture-level chrominance quantization parameter offset value associated with all video blocks within a picture, the picture comprising one or more slices,
    the method further comprising, for each of the one or more chrominance components, determining a slice-level chrominance quantization parameter offset value associated with all video blocks within one of the slices, and
    wherein calculating the chrominance quantization parameter used to configure the chrominance component deblocking filter for the common edge comprises calculating the chrominance quantization parameter based on the first luminance quantization parameter for the first block of video data, the second luminance quantization parameter for the second block of video data, the picture-level chrominance quantization parameter offset value for the chrominance component, and the slice-level chrominance quantization parameter offset value for the chrominance component.

8. The method of claim 7, wherein calculating the chrominance quantization parameter used to configure the chrominance component deblocking filter for the common edge comprises calculating:

$$QpUV((QP_{Y,P}+QP_{Y,Q}+1)/2+c\_qp\_offset+slice\_qp\_delta\_c),$$

wherein QpUV comprises a table that specifies values of the chrominance quantization parameter used to configured the chrominance component deblocking filter for the common edge based on values of $(QP_{Y,P}+QP_{Y,Q}+1)/2+c\_qp\_offset+slice\_qp\_delta\_c$, wherein $c\_qp\_offset$ comprises the picture-level chrominance quantization parameter offset value, wherein $slice\_qp\_delta\_c$ comprises the slice-level chrominance quantization parameter offset value, wherein $QP_{Y,P}$ comprises the first luminance quantization parameter for the first block of video data and $QP_{Y,Q}$ comprises the second luminance quantization parameter for the second block of video data, and wherein $(QP_{Y,P}+QP_{Y,Q}+1)/2$ comprises an average of the first luminance quantization parameter for the first block of video data and the second luminance quantization parameter for the second block of video data.

9. The method of claim 7, wherein the first block of video data is within a first one of the slices associated with a first slice-level chrominance quantization parameter offset value, and the second block of video data is within a second one of the slices associated with a second slice-level chrominance quantization parameter offset value, and wherein determining the slice-level chrominance quantization parameter offset value comprises selecting one of the first slice-level chrominance quantization parameter offset value and the second slice-level chrominance quantization parameter offset value.

10. The method of claim 7, wherein the first block of video data is within a first one of the slices associated with a first slice-level chrominance quantization parameter offset value, and the second block of video data is within a second one of the slices associated with a second slice-level chrominance quantization parameter offset value, and wherein determining the slice-level chrominance quantization parameter offset value comprises determining an average of the first slice-level chrominance quantization parameter offset value and the second slice-level chrominance quantization parameter offset value.

11. The method of claim 10, wherein the first block of video data is within a first one of the slices associated with a first slice-level chrominance quantization parameter offset value, and the second block of video data is within a second one of the slices associated with a second slice-level chrominance quantization parameter offset value, and wherein calculating the chrominance quantization parameter used to configure the chrominance component deblocking filter for the common edge comprises calculating:

$$QpUV((QP_{Y,P}+slice\_qp\_delta\_P+QP_{Y,Q}+slice\_qp\_delta\_Q+1)/2+c\_qp\_offset),$$

wherein QpUV comprises a table that specifies values of the chrominance quantization parameter used to configure the chrominance component deblocking filter for the common edge based on values of $(QP_{Y,P}+slice\_qp\_delta\_P+QP_{Y,Q}+slice\_qp\_delta\_Q+1)/2+c\_qp\_offset$, wherein $c\_qp\_offset$ comprises the picture-level chrominance quantization parameter offset value, wherein $slice\_qp\_delta\_P$ comprises the first slice-level chrominance quantization parameter offset value, wherein $slice\_qp\_delta\_Q$ comprises the second slice-level chrominance quantization parameter offset value, and wherein $QP_{Y,P}$ comprises the first luminance quantization parameter for the first block of video data and $QP_{Y,Q}$ comprises the second luminance quantization parameter for the second block of video data.

12. The method of claim 10, wherein the first block of video data is within a first one of the slices associated with a first slice-level chrominance quantization parameter offset value, and the second block of video data is within a second one of the slices associated with a second slice-level chrominance quantization parameter offset value, and wherein calculating the chrominance quantization parameter used to configure the chrominance component deblocking filter for the common edge comprises calculating:

$$(QpUV(QP_{Y,P}+c\_qp\_offset+slice\_qp\_delta\_P)+QpUV(QP_{Y,Q}+c\_qp\_offset+slice\_qp\_delta\_Q)+1)/2,$$

wherein QpUV comprises a table that specifies values of the chrominance quantization parameter used to configure the chrominance component deblocking filter for the common edge based on values of $QP_{Y,P}+c\_qp\_offset+slice\_qp\_delta\_P$ and $QP_{Y,Q}+c\_qp\_offset+slice\_qp\_delta\_Q$, wherein $c\_qp\_offset$ comprises the picture-level chrominance quantization parameter offset value, wherein $slice\_qp\_delta\_P$ comprises the first slice-level chrominance quantization parameter offset value, wherein $slice\_qp\_delta\_Q$ comprises the second slice-level chrominance quantization parameter offset value, and wherein $QP_{Y,P}$ comprises the first luminance quantization parameter for the first block of video data and $QP_{Y,Q}$ comprises the second luminance quantization parameter for the second block of video data.

13. The method of claim 7, further comprising determining a chrominance format, wherein calculating the chrominance quantization parameter used to configure the chrominance component deblocking filter for the common edge based on the first luminance quantization parameter for the first block of video data, the second luminance quantization parameter for the second block of video data, the picture-level chrominance quantization parameter offset value for the chrominance component, and the slice-level chrominance quantization parameter offset value for the chrominance component comprises determining whether either of the picture-level chrominance quantization parameter offset value and the slice-level chrominance quantization parameter offset value are used to calculate the chrominance quantization parameter used to configure the chrominance component deblocking filter for the common edge based on the chrominance format.

14. The method of claim 7, further comprising determining one of a profile or level associated with the video data, wherein calculating the chrominance quantization parameter used to configure the chrominance component deblocking filter for the common edge based on the first luminance quantization parameter for the first block of video data, the second luminance quantization parameter for the second block of video data, the picture-level chrominance quantization parameter offset value for the chrominance component, and the slice-level chrominance quantization parameter offset value for the chrominance component comprises determining whether either of the picture-level chrominance quantization parameter offset value and the slice-level chrominance quantization parameter offset value are used to calculate the chrominance quantization parameter used to configure the chrominance component deblocking filter for the common edge based on the profile or level.

15. The method of claim 1, wherein decoding the first block of video data and the second block of video data comprises decoding the first and second blocks of video data by a decoder for presentation of the video data to a user.

16. The method of claim 1,
wherein applying the deblocking filter comprises applying the deblocking filter by an encoder for in-loop filtering of the video data prior to storage in a reference picture list.

17. An apparatus for processing video data, the apparatus comprising:
a memory configured to store the video data; and
a video coder configured to:
  decode a first block of the video data and a second block of the video data, wherein the first block of the video data and the second block of the video data share a common edge;
  determine a first luminance quantization parameter for the first block of the video data and a second luminance quantization parameter for the second block of the video data;
  for each of one or more chrominance components, determine a chrominance quantization parameter offset value;
  for each of the one or more chrominance components, calculate a chrominance quantization parameter used to configure a chrominance component deblocking filter for the common edge based on the first luminance quantization parameter for the first block of the video data, the second luminance quantization parameter for the second block of the video data, and the chrominance quantization parameter offset value for the chrominance component;
  for each of the one or more chrominance components, determine a strength for the deblocking filter for the common edge based on the chrominance quantization parameter used to configure the chrominance component deblocking filter for the common for the edge; and
  for each of the one or more chrominance components, apply the deblocking filter according to the determined strength to deblock the common edge,
wherein, to calculate the chrominance quantization parameter used to configure the chrominance component deblocking filter for the common edge, the video coder is configured to:
  calculate an average of the first luminance quantization parameter for the first block of the video data and the second luminance quantization parameter for the second block of the video data; and
  apply the chrominance quantization parameter offset value to the average.

18. The apparatus of claim 17, wherein, to calculate the chrominance quantization parameter used to configure the chrominance component deblocking filter for the common edge, the video coder is configured to calculate:

$$QpUV((QP_{Y,P}+QP_{Y,Q}+1)/2+c\_qp\_offset),$$

wherein QpUV comprises a table that specifies values of the chrominance quantization parameter used to configure the chrominance component deblocking filter for the common edge based on values of $(QP_{Y,P}+QP_{Y,Q}+1)/2+c\_qp\_offset$, wherein c_qp_offset comprises the chrominance quantization parameter offset value,
wherein $QP_{Y,P}$ comprises the first luminance quantization parameter for the first block of the video data and $QP_{Y,Q}$ comprises the second luminance quantization parameter for the second block of the video data, and
wherein $(QP_{Y,P}+QP_{Y,Q}+1)/2$ comprises the average of the first luminance quantization parameter for the first block of the video data and the second luminance quantization parameter for the second block of the video data.

19. The apparatus of claim 17, wherein to calculate the chrominance quantization parameter used to configure the chrominance component deblocking filter for the common edge, the video coder is configured to calculate:

$$Clip3(0,51,(QP_{Y,P}+QP_{Y,Q}+1)/2+c\_qp\_offset)),$$

wherein c_qp_offset comprises the chrominance quantization parameter offset value,
wherein $QP_{Y,P}$ comprises the first luminance quantization parameter for the first block of the video data and $QP_{Y,Q}$ comprises the second luminance quantization parameter for the second block of the video data, and
wherein $(QP_{Y,P}+QP_{Y,Q}+1)/2$ comprises the average of the first luminance quantization parameter for the first block of the video data and the second luminance quantization parameter for the second block of the video data.

20. The apparatus of claim 17, wherein the chrominance quantization parameter offset value is signaled in a picture parameter set.

21. The apparatus of claim 17, wherein the video coder is further configured to at least one of:
apply the chrominance quantization parameter offset value to the first luminance quantization parameter for the first block of the video data to determine a first chrominance quantization parameter for the first block of the video data; or
apply the chrominance quantization parameter offset value to the second luminance quantization parameter for the second block of the video data to determine a second chrominance quantization parameter for the second block of the video data.

22. The apparatus of claim 17, wherein, to determine the strength for the deblocking filter for the common edge based on the chrominance quantization parameter used to configure the chrominance component deblocking filter for the common edge, the video coder is configured to determine a first parameter based on the chrominance quantization parameter, wherein the first parameter is applied in a clipping operation of the deblocking filter.

23. The apparatus of claim 17,
wherein the chrominance quantization parameter offset value comprises a picture-level chrominance quantization parameter offset value associated with all video blocks within a picture, the picture comprising one or more slices,
wherein the video coder is further configured to, for each of the one or more chrominance components, determine a slice-level chrominance quantization parameter offset value associated with all video blocks within one of the slices, and
wherein, to calculate the chrominance quantization parameter used to configure the chrominance component deblocking filter for the common edge, the video coder is further configured to calculate the chrominance quantization parameter based on the first luminance quantization parameter for the first block of the video data, the second luminance quantization parameter for the second block of the video data, the picture-level chrominance quantization parameter offset value for the chrominance component, and the slice-level chrominance quantization parameter offset value for the chrominance component.

24. The apparatus of claim 23, wherein, to calculate the chrominance quantization parameter used to configure the chrominance component deblocking filter for the common edge, the video coder is configured to calculate:

$$\text{Qp}UV((\text{QP}_{Y,P}+\text{QP}_{Y,Q}+1)/2+c\_qp\_offset+slice\_qp\_delta\_c),$$

wherein QpUV comprises a table that specifies values of the chrominance quantization parameter used to configure the chrominance component deblocking filter for the common edge based on values of $(\text{QP}_{Y,P}+\text{QP}_{Y,Q}+1)/2+c\_qp\_offset+slice\_qp\_delta\_c)$, wherein c_qp_offset comprises the picture-level chrominance quantization parameter offset value, wherein slice_qp_delta_c comprises the slice-level chrominance quantization parameter offset value, wherein $\text{QP}_{Y,P}$ comprises the first luminance quantization parameter for the first block of the video data and $\text{QP}_{Y,Q}$ comprises the second luminance quantization parameter for the second block of the video data, and wherein $(\text{QP}_{Y,P}+\text{QP}_{Y,Q}+1)/2$ comprises an average of the first luminance quantization parameter for the first block of the video data and the second luminance quantization parameter for the second block of the video data.

25. The apparatus of claim 23,
wherein the first block of the video data is within a first one of the slices associated with a first slice-level chrominance quantization parameter offset value, and the second block of the video data is within a second one of the slices associated with a second slice-level chrominance quantization parameter offset value, and
wherein to determine the slice-level chrominance quantization parameter offset value, the video coder is configured to select one of the first slice-level chrominance quantization parameter offset value and the second slice-level chrominance quantization parameter offset value.

26. The apparatus of claim 23,
wherein the first block of the video data is within a first one of the slices associated with a first slice-level chrominance quantization parameter offset value, and the second block of the video data is within a second one of the slices associated with a second slice-level chrominance quantization parameter offset value, and
wherein, to determine the slice-level chrominance quantization parameter offset value, the video coder is configured to determine an average of the first slice-level chrominance quantization parameter offset value and the second slice-level chrominance quantization parameter offset value.

27. The apparatus of claim 26, wherein the first block of the video data is within a first one of the slices associated with a first slice-level chrominance quantization parameter offset value, and the second block of the video data is within a second one of the slices associated with a second slice-level chrominance quantization parameter offset value, and wherein, to calculate the chrominance quantization parameter used to configure the chrominance component deblocking filter for the common edge, the video coder is configured to calculate:

$$\text{Qp}UV((\text{QP}_{Y,P}+slice\_qp\_delta\_P+\text{QP}_{Y,Q}+slice\_qp\_delta\_Q+1)/2+c\_qp\_offset),$$

wherein QpUV comprises a table that specifies values of the chrominance quantization parameter used to configure the chrominance component deblocking filter for the common edge based on values of $(\text{QP}_{Y,P}+slice\_qp\_delta\_P+\text{QP}_{Y,Q}+slice\_qp\_delta\_Q+1)/2+c\_qp\_offset$, wherein c_qp_offset comprises the picture-level chrominance quantization parameter offset value, wherein slice_qp_delta_P comprises the first slice-level chrominance quantization parameter offset value, wherein slice_qp_delta_Q comprises the second slice-level chrominance quantization parameter offset value, and wherein $\text{QP}_{Y,P}$ comprises the first luminance quantization parameter for the first block of the video data and $\text{QP}_{Y,Q}$ comprises the second luminance quantization parameter for the second block of the video data.

28. The apparatus of claim 26, wherein the first block of video data is within a first one of the slices associated with a first slice-level chrominance quantization parameter offset value, and the second block of video data is within a second one of the slices associated with a second slice-level chrominance quantization parameter offset value, and wherein, to calculate the chrominance quantization parameter used to configure the chrominance component deblocking filter for the common edge, the video coder is configured to calculate:

$$(\text{Qp}UV(\text{QP}_{Y,P}+c\_qp\_offset+slice\_qp\_delta\_P)+\text{Qp}UV(\text{QP}_{Y,Q}+c\_qp\_offset+slice\_qp\_delta\_Q)+1)/2,$$

wherein QpUV comprises a table that specifies values of the chrominance quantization parameter used to configure the chrominance component deblocking filter for the common edge based on values of $\text{QP}_{Y,P}+c\_qp\_offset+slice\_qp\_delta\_P$ and $\text{QP}_{Y,Q}+c\_qp\_offset+slice\_qp\_delta\_Q$, wherein c_qp_offset comprises the picture-level chrominance quantization parameter offset value, wherein slice_qp_delta_P comprises the first slice-level chrominance quantization parameter offset value, wherein slice_qp_delta_Q comprises the second slice-level chrominance quantization parameter offset value, and wherein $\text{QP}_{Y,P}$ comprises the first luminance quantization parameter for the first block of the video data and $\text{QP}_{Y,Q}$ comprises the second luminance quantization parameter for the second block of the video data.

29. The apparatus of claim 23,
wherein the video coder is further configured to determine a chrominance format,
wherein, to calculate the chrominance quantization parameter used to configure the chrominance component deblocking filter for the common edge based on the first luminance quantization parameter for the first block of the video data, the second luminance quantization parameter for the second block of the video data, the picture-level chrominance quantization parameter offset value for the chrominance component, and the slice-level chrominance quantization parameter offset value for the chrominance component, the video coder is configured to determine whether either of the picture-level chrominance quantization parameter offset value and the slice-level chrominance quantization parameter offset value are used to calculate the chrominance quantization parameter used to configure the chrominance component deblocking filter for the common edge based on the chrominance format.

30. The apparatus of claim 23,
wherein the video coder is further configured to determine one of a profile or level associated with the video data,
wherein, to calculate the chrominance quantization parameter used to configure the chrominance component deblocking filter for the common edge based on the first luminance quantization parameter for the first block of the video data, the second luminance quantization parameter for the second block of the video data, the picture-level chrominance quantization parameter offset value for the chrominance component, and the slice-level chrominance quantization parameter offset value for the chrominance component, the video coder is configured to determine whether either of the picture-level chrominance quantization parameter offset value and the slice-level chrominance quantization parameter offset value are used to calculate the chrominance quantization parameter used to configure the chrominance component deblocking filter for the common edge based on the profile or level.

31. The apparatus of claim 17, further comprising a display configured to display the first block of the video data and the second block of the video data, wherein the video coder comprises a video decoder configured to decode the first block of the video data and the second block of the video data for presentation of the video data to a user via the display.

32. The apparatus of claim 17, further comprising a video camera configured to capture a picture that includes the first block of the video data and the second block of the video data, wherein the video coder comprises a video encoder configured to apply the deblocking filter for in-loop filtering of the video data prior to storage of the picture in a reference picture list.

33. The apparatus of claim 17, wherein the apparatus comprises at least one of:
an integrated circuit;
a microprocessor; and
a wireless communication device that includes the video coder.

34. An apparatus for processing video data, the apparatus comprising:
means for decoding a first block of video data and a second block of video data, wherein the first block of video data and the second block of video data share a common edge;
means for determining a first luminance quantization parameter for the first block of video data and a second luminance quantization parameter for the second block of video data;
means for, for each of one or more chrominance components, determining a chrominance quantization parameter offset value;
means for, for each of the one or more chrominance components, calculating a chrominance quantization parameter used to configure a chrominance component deblocking filter for the common edge based on the first luminance quantization parameter for the first block of video data, the second luminance quantization parameter for the second block of video data, and the chrominance quantization parameter offset value for the chrominance component;
means for, for each of the one or more chrominance components, determining a strength for the deblocking filter for the common edge based on the chrominance quantization parameter used to configure the chrominance component deblocking filter for the common edge; and
means for, for each of the one or more chrominance components, applying the deblocking filter according to the determined strength to deblock the common edge,
wherein the means for calculating the chrominance quantization parameter used to configure the chrominance component deblocking filter for the common edge comprises:
means for calculating an average of the first luminance quantization parameter for the first block of video data and the second luminance quantization parameter for the second block of video data; and
means for applying the chrominance quantization parameter offset value to the average.

35. The apparatus of claim 34, wherein the means for calculating the chrominance quantization parameter used to configure the chrominance component deblocking filter for the common edge comprises means for calculating:

$$\text{Qp}UV((\text{QP}_{Y,P}+\text{QP}_{Y,Q}+1)/2+c\_qp\_\text{offset}),$$

wherein QpUV comprises a table that specifies values of the chrominance quantization parameter used to configure the chrominance component deblocking filter for the common edge based on values of $(\text{QP}_{Y,P}+\text{QP}_{Y,Q}+1)/2+c\_qp\_\text{offset}$,
wherein c_qp_offset comprises the chrominance quantization parameter offset value,
wherein $\text{QP}_{Y,P}$ comprises the first luminance quantization parameter for the first block of video data and $\text{QP}_{Y,Q}$ comprises the second luminance quantization parameter for the second block of video data, and
wherein $(\text{QP}_{Y,P}+\text{QP}_{Y,Q}+1)/2$ comprises the average of the first luminance quantization parameter for the first block of video data and the second luminance quantization parameter for the second block of video data.

36. The apparatus of claim 34, wherein the chrominance quantization parameter offset value is signaled in a picture parameter set.

37. The apparatus of claim 34, wherein the means for determining a strength for a deblocking filter for the common edge based on the chrominance quantization parameter used to configure the chrominance component deblocking filter for the common edge comprises means for determining a first parameter based on the chrominance quantization parameter, wherein the first parameter is applied in a clipping operation of the deblocking filter.

38. The apparatus of claim 34,
wherein the chrominance quantization parameter offset value comprises a picture-level chrominance quantization parameter offset value associated with all video blocks within a picture, the picture comprising one or more slices,
the apparatus further comprising means for, for each of the one or more chrominance components, determining a slice-level chrominance quantization parameter offset value associated with all video blocks within one of the slices, and
wherein the means for calculating the chrominance quantization parameter used to configure the chrominance component deblocking filter for the common edge comprises means for calculating the chrominance quantization parameter based on the first luminance quantization parameter for the first block of video data, the second luminance quantization parameter for the second block of video data, the picture-level chrominance quantization parameter offset value for the chrominance component, and the slice-level chrominance quantization parameter offset value for the chrominance component.

39. The apparatus of claim 38,
wherein the first block of video data is within a first one of the slices associated with a first slice-level chrominance quantization parameter offset value, and the second block of video data is within a second one of the slices associated with a second slice-level chrominance quantization parameter offset value, and
wherein the means for determining the slice-level chrominance quantization parameter offset value comprises means for selecting one of the first slice-level chrominance quantization parameter offset value and the second slice-level chrominance quantization parameter offset value.

40. The apparatus of claim 38,
wherein the first block of video data is within a first one of the slices associated with a first slice-level chrominance quantization parameter offset value, and the second block of video data is within a second one of the slices associated with a second slice-level chrominance quantization parameter offset value, and
wherein the means for determining the slice-level chrominance quantization parameter offset value comprises means for determining an average of the first slice-level chrominance quantization parameter offset value and the second slice-level chrominance quantization parameter offset value.

41. A non-transitory computer-readable storage medium comprising instructions stored thereon that, when executed, cause a processor of a video coder to:
  decode a first block of video data and a second block of video data, wherein the first block of video data and the second block of video data share a common edge;
  determine a first luminance quantization parameter for the first block of video data and a second luminance quantization parameter for the second block of video data;
  for each of one or more chrominance components, determine a chrominance quantization parameter offset value;
  for each of the one or more chrominance components, calculate a chrominance quantization parameter used to configure a chrominance component deblocking filter for the common edge based on the first luminance quantization parameter for the first block of video data, the second luminance quantization parameter for the second block of video data, and the chrominance quantization parameter offset value for the chrominance component;
  for each of the one or more chrominance components, determine a strength for the deblocking filter for the common edge based on the chrominance quantization parameter used to configure a chrominance component deblocking filter for the common edge; and
  for each of the one or more chrominance components, apply the deblocking filter according to the determined strength to deblock the common edge,
wherein the instructions that cause the processor calculate the chrominance quantization parameter used to configure the chrominance component deblocking filter for the common edge comprise instructions that cause the processor to:
  calculate an average of the first luminance quantization parameter for the first block of video data and the second luminance quantization parameter for the second block of video data; and
  apply the chrominance quantization parameter offset value to the average.

42. The non-transitory computer-readable storage medium of claim 41, wherein the instructions that cause the processor to calculate the chrominance quantization parameter used to configure the chrominance component deblocking filter for the common edge comprise instructions that cause the processor to calculate:

$$QpUV((QP_{Y,P}+QP_{Y,Q}+1)/2+c\_qp\_offset),$$

wherein QpUV comprises a table that specifies values of the chrominance quantization parameter used to configure the chrominance component deblocking filter for the common edge based on values of $(QP_{Y,P}+QP_{Y,Q}+1)/2+c\_qp\_offset$,
wherein $c\_qp\_offset$ comprises the chrominance quantization parameter offset value,
wherein $QP_{Y,P}$ comprises the first luminance quantization parameter for the first block of video data and $QP_{Y,Q}$ comprises the second luminance quantization parameter for the second block of video data, and
wherein $QpUV\ ((QP_{Y,P}+QP_{Y,Q}+1)/2$ comprises the average of the first luminance quantization parameter for the first block of video data and the second luminance quantization parameter for the second block of video data.

43. The non-transitory computer-readable storage medium of claim 41, wherein the chrominance quantization parameter offset value is signaled in a picture parameter set.

44. The non-transitory computer-readable storage medium of claim 41, wherein the instructions that cause a processor to determine a strength for a deblocking filter for the common edge based on the chrominance quantization parameter used to configure the chrominance component deblocking filter for the common edge comprise instructions that cause the processor to determine a first parameter based on the chrominance quantization parameter, wherein the first parameter is applied in a clipping operation of the deblocking filter.

45. The non-transitory computer-readable storage medium of claim 41,
wherein the chrominance quantization parameter offset value comprises a picture-level chrominance quantization parameter offset value associated with all video blocks within a picture, the picture comprising one or more slices,
the medium further comprising instructions that cause the processor to, for each of the one or more chrominance components, determine a slice-level chrominance quantization parameter offset value associated with all video blocks within one of the slices, and
wherein the instructions that cause the processor to calculate the chrominance quantization parameter used to configure the chrominance component deblocking filter for the common edge comprise instructions that cause the processor to calculate the chrominance quantization parameter based on the first luminance quantization parameter for the first block of video data, the second luminance quantization parameter for the second block of video data, the picture-level chrominance quantization parameter offset value for the chrominance component, and the slice-level chrominance quantization parameter offset value for the chrominance component.

46. The non-transitory computer-readable storage medium of claim 45,
wherein the first block of video data is within a first one of the slices associated with a first slice-level chrominance quantization parameter offset value, and the second block of video data is within a second one of the slices associated with a second slice-level chrominance quantization parameter offset value, and
wherein the instructions that cause the processor to determine the slice-level chrominance quantization parameter offset value comprise instructions that cause the processor to select one of the first slice-level chrominance quantization parameter offset value and the second slice-level chrominance quantization parameter offset value.

47. The non-transitory computer-readable storage medium of claim 45,
wherein the first block of video data is within a first one of the slices associated with a first slice-level chrominance quantization parameter offset value, and the second block of video data is within a second one of the slices associated with a second slice-level chrominance quantization parameter offset value, and
wherein the instructions that cause the processor to determine the slice-level chrominance quantization parameter offset value comprise instructions that cause the processor to determine an average of the first slice-level chrominance quantization parameter offset value and the second slice-level chrominance quantization parameter offset value.

* * * * *